US010528021B2

(12) United States Patent
Billi et al.

(10) Patent No.: US 10,528,021 B2
(45) Date of Patent: Jan. 7, 2020

(54) AUTOMATED CREATION OF INDUSTRIAL DASHBOARDS AND WIDGETS

(71) Applicant: Rockwell Automation Technologies, Inc., Mayfield Heights, OH (US)

(72) Inventors: Sharon M. Billi, Euclid, OH (US); Christopher W. Como, Chagrin Falls, OH (US); Edward A. Gray, Olmsted Township, OH (US); Kyle K. Reissner, Hudson, OH (US); Jonathan D. Walter, Broadview Heights, OH (US); Mohit Singhai, Lyndhurst, OH (US); Douglas J. Reichard, Fairview Park, OH (US); Scott N. Sandler, Chagrin Falls, OH (US); Ronald E. Bliss, Twinsburg, OH (US); Michael J. Pantaleano, Willoughby, OH (US); Ryan Cahalane, Chagrin Falls, OH (US); Jessica Korpela, Milwaukee, WI (US); Bruce T. McCleave, Mission Viejo, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 428 days.

(21) Appl. No.: 14/928,305

(22) Filed: Oct. 30, 2015

(65) Prior Publication Data

US 2017/0123397 A1 May 4, 2017

(51) Int. Cl.
*G05B 19/048* (2006.01)
*G06F 3/0484* (2013.01)
(Continued)

(52) U.S. Cl.
CPC ........... *G05B 19/048* (2013.01); *G05B 15/02* (2013.01); *G06F 3/0484* (2013.01);
(Continued)

(58) Field of Classification Search
CPC .............. G05B 19/048; G05B 15/02; G05B 2219/24015; G05B 19/4184;
(Continued)

(56) References Cited

U.S. PATENT DOCUMENTS 5,168,441 A 12/1992 Onarheim et al.
5,471,214 A 11/1995 Faibish et al.
(Continued)

FOREIGN PATENT DOCUMENTS

CN 103543700 8/2016
EP 1 814 045 A2 8/2007
(Continued)

OTHER PUBLICATIONS

European Office Action for European Patent Application Serial No. 16196582.7-1871 dated Jan. 31, 2017, 9 pages.
(Continued)

*Primary Examiner* — M. N. Von Buhr
(74) *Attorney, Agent, or Firm* — Amin, Turocy & Watson, LLP

(57) ABSTRACT

A multi-platform industrial search and notification system performs automated and manually initiate information searches across multiple disparate industrial data platforms. The search system is built on a search platform that unifies plant-wide control system information from multiple diverse sources under a common namespace, or federated data model. The system can monitor this federated data model for conditions that may warrant attention by plant personnel, and deliver proactive notifications and operational data to selected users via their personal devices. The system can customize presentation of this data based on the user's role, location, and/or other contextual information. To this end, the system can automatically generate user-specific and context-specific dashboards, widgets, or other visualiza-
(Continued)

tions, and render these custom visualizations to the user at appropriate times.

20 Claims, 23 Drawing Sheets

(51) Int. Cl.
  *G06T 11/20* (2006.01)
  *G06Q 10/06* (2012.01)
  *G05B 15/02* (2006.01)
  *G05B 19/418* (2006.01)

(52) U.S. Cl.
  CPC ....... *G06Q 10/063* (2013.01); *G06Q 10/0639* (2013.01); *G06T 11/206* (2013.01); *G05B 19/4184* (2013.01); *G05B 2219/24015* (2013.01); *Y02P 90/14* (2015.11); *Y02P 90/18* (2015.11)

(58) Field of Classification Search
  CPC ... G06T 11/206; G06F 3/0484; G06Q 10/063; G06Q 10/0639; Y02P 90/14; Y02P 90/18
  See application file for complete search history.

(56) References Cited

U.S. PATENT DOCUMENTS

| | | | |
|---|---|---|---|
| 5,777,874 A | 7/1998 | Flood et al. | |
| 6,002,406 A | 12/1999 | Zhao | |
| 6,334,124 B1 | 12/2001 | Bouchard et al. | |
| 6,583,794 B1 | 6/2003 | Wattenberg | |
| 6,788,315 B1 | 9/2004 | Kekic et al. | |
| 7,612,661 B1 | 11/2009 | Johnson et al. | |
| 8,285,744 B2 | 10/2012 | Dorgelo et al. | |
| 8,453,091 B1 | 5/2013 | Rao et al. | |
| 8,489,641 B1 | 7/2013 | Seefeld et al. | |
| 8,819,149 B2* | 8/2014 | Amidon | H04M 3/42374 709/206 |
| 8,886,153 B2* | 11/2014 | Velusamy | H04W 4/90 455/404.1 |
| 9,069,382 B1 | 6/2015 | Starner et al. | |
| 9,213,714 B1 | 12/2015 | Ording | |
| 9,237,141 B2 | 1/2016 | Logue et al. | |
| 9,438,648 B2* | 9/2016 | Asenjo | H04L 65/403 |
| 9,709,978 B2 | 7/2017 | Asenjo et al. | |
| 9,937,577 B2 | 4/2018 | Daniel et al. | |
| 9,952,882 B2* | 4/2018 | Kuscher | G06F 9/445 |
| 2002/0049775 A1 | 4/2002 | Friedrich et al. | |
| 2002/0158873 A1 | 10/2002 | Williamson | |
| 2004/0181549 A1 | 9/2004 | Pate | |
| 2005/0010307 A1 | 1/2005 | Dove et al. | |
| 2005/0023347 A1 | 2/2005 | Wetzel et al. | |
| 2005/0188376 A1 | 8/2005 | Matsumoto et al. | |
| 2005/0204315 A1 | 9/2005 | Knol et al. | |
| 2006/0161544 A1 | 7/2006 | Lee et al. | |
| 2006/0241792 A1 | 10/2006 | Pretlove et al. | |
| 2006/0271884 A1 | 11/2006 | Hurst | |
| 2007/0078824 A1 | 4/2007 | Dorgelo et al. | |
| 2008/0007555 A1 | 1/2008 | Vrba et al. | |
| 2008/0072180 A1 | 3/2008 | Chevalier et al. | |
| 2009/0077055 A1 | 3/2009 | Dillon et al. | |
| 2009/0085934 A1 | 4/2009 | Baier et al. | |
| 2009/0086021 A1 | 4/2009 | Baier et al. | |
| 2009/0088875 A1 | 4/2009 | Baier et al. | |
| 2009/0089225 A1 | 4/2009 | Baier et al. | |
| 2009/0112816 A1 | 4/2009 | Marlow | |
| 2009/0125796 A1 | 5/2009 | Day et al. | |
| 2009/0216341 A1 | 8/2009 | Enkerud et al. | |
| 2009/0307162 A1 | 12/2009 | Bui et al. | |
| 2009/0307255 A1 | 12/2009 | Park | |
| 2010/0016995 A1 | 1/2010 | Barat | |
| 2010/0082661 A1 | 4/2010 | Beaudreau | |
| 2011/0022198 A1 | 1/2011 | Plache et al. | |
| 2011/0119227 A1 | 3/2011 | Wang et al. | |
| 2011/0093188 A1 | 4/2011 | Barkai et al. | |
| 2011/0115816 A1 | 5/2011 | Brackney | |
| 2011/0298579 A1 | 12/2011 | Hardegger et al. | |
| 2011/0316884 A1 | 12/2011 | Giambalvo et al. | |
| 2012/0120070 A1 | 5/2012 | Baillot | |
| 2012/0233573 A1 | 9/2012 | Sullivan et al. | |
| 2012/0242648 A1 | 9/2012 | Baier et al. | |
| 2012/0249588 A1 | 10/2012 | Tison et al. | |
| 2012/0249741 A1 | 10/2012 | Maciocci et al. | |
| 2012/0254792 A1 | 10/2012 | Husoy et al. | |
| 2012/0259436 A1 | 10/2012 | Resurreccion et al. | |
| 2012/0300089 A1 | 11/2012 | Sbaiz et al. | |
| 2012/0314571 A1 | 12/2012 | Forssell | |
| 2013/0006395 A1 | 1/2013 | Plache et al. | |
| 2013/0031508 A1 | 1/2013 | Kodosky et al. | |
| 2013/0054573 A1 | 2/2013 | Snellman et al. | |
| 2013/0073400 A1 | 3/2013 | Heath | |
| 2013/0110978 A1* | 5/2013 | Gordon | H04N 21/2665 709/218 |
| 2013/0120449 A1 | 5/2013 | Ihara et al. | |
| 2013/0124253 A1 | 5/2013 | Cooper et al. | |
| 2013/0124465 A1 | 5/2013 | Pingel et al. | |
| 2013/0124613 A1 | 5/2013 | Plache et al. | |
| 2013/0125233 A1 | 5/2013 | Bush et al. | |
| 2013/0169681 A1 | 7/2013 | Rasane et al. | |
| 2013/0211546 A1 | 8/2013 | Lawson et al. | |
| 2013/0211559 A1 | 8/2013 | Lawson et al. | |
| 2013/0222373 A1 | 8/2013 | Weinstein et al. | |
| 2013/0246539 A1 | 9/2013 | Davis | |
| 2013/0083012 A1 | 10/2013 | Han et al. | |
| 2013/0257863 A1 | 10/2013 | Mikkelsen | |
| 2013/0275908 A1 | 10/2013 | Reichard | |
| 2013/0290899 A1 | 10/2013 | Amran | |
| 2014/0032849 A1 | 1/2014 | De Vleeschauwer et al. | |
| 2014/0047064 A1 | 2/2014 | Maturana et al. | |
| 2014/0047106 A1 | 2/2014 | Leung et al. | |
| 2014/0047107 A1 | 2/2014 | Maturana et al. | |
| 2014/0143395 A1* | 5/2014 | Geltner | H04W 4/70 709/223 |
| 2014/0207870 A1 | 7/2014 | Vaya | |
| 2014/0240356 A1 | 8/2014 | Cupitt et al. | |
| 2014/0250377 A1 | 9/2014 | Bisca et al. | |
| 2014/0253588 A1 | 9/2014 | Mandala | |
| 2014/0258940 A1 | 9/2014 | Han et al. | |
| 2014/0282215 A1 | 9/2014 | Grubbs et al. | |
| 2014/0316540 A1 | 10/2014 | Loncar et al. | |
| 2014/0335480 A1 | 11/2014 | Asenjo et al. | |
| 2014/0336785 A1 | 11/2014 | Asenjo et al. | |
| 2014/0358256 A1 | 12/2014 | Billi et al. | |
| 2015/0077555 A1 | 3/2015 | Scalisi | |
| 2015/0146007 A1 | 5/2015 | Dusik et al. | |
| 2015/0213465 A1 | 7/2015 | Noyes et al. | |
| 2015/0281329 A1 | 10/2015 | Dimov | |
| 2015/0371455 A1 | 12/2015 | Abdel-Rahman et al. | |
| 2016/0103750 A1* | 4/2016 | Cooper | G06F 11/3495 719/328 |
| 2016/0127690 A1 | 5/2016 | Kaehler et al. | |
| 2016/0132538 A1 | 5/2016 | Bliss et al. | |
| 2016/0132595 A1 | 5/2016 | Bliss et al. | |
| 2016/0176724 A1 | 6/2016 | Ji et al. | |
| 2016/0217381 A1* | 7/2016 | Bloomquist | G06N 5/02 |
| 2016/0226731 A1 | 8/2016 | Maroulis | |
| 2016/0267759 A1 | 9/2016 | Kerzner | |
| 2016/0274553 A1 | 9/2016 | Strohmenger et al. | |
| 2016/0292895 A1* | 10/2016 | Billi | G06T 11/60 |
| 2016/0322078 A1 | 11/2016 | Bose et al. | |
| 2016/0337289 A1* | 11/2016 | Duca | H04L 67/26 |
| 2016/0337441 A1* | 11/2016 | Bloomquist | G06F 9/5061 |
| 2016/0343163 A1 | 11/2016 | Venkatesha et al. | |
| 2017/0032574 A1 | 2/2017 | Sugaya | |
| 2017/0053445 A1 | 2/2017 | Chen et al. | |
| 2017/0060379 A1 | 3/2017 | Capozella et al. | |
| 2017/0091607 A1 | 3/2017 | Emeis et al. | |
| 2017/0108838 A1 | 4/2017 | Todeschini et al. | |
| 2017/0116259 A1 | 4/2017 | Elliot et al. | |
| 2017/0195265 A1* | 7/2017 | Billi | H04L 51/046 |
| 2017/0210017 A1 | 7/2017 | Yamamoto et al. | |
| 2017/0270362 A1 | 9/2017 | Barnehama et al. | |
| 2017/0300753 A1* | 10/2017 | Billi | G06K 9/00718 |

(56) References Cited

U.S. PATENT DOCUMENTS

| | | |
|---|---|---|
| 2017/0337352 A1 | 11/2017 | Williams |
| 2018/0054432 A1 | 2/2018 | Bailey et al. |
| 2018/0075759 A1 | 3/2018 | Kim et al. |
| 2018/0222052 A1 | 8/2018 | Vu et al. |
| 2018/0349654 A1 | 12/2018 | Takeshima et al. |
| 2019/0156584 A1 | 5/2019 | Herman et al. |

FOREIGN PATENT DOCUMENTS

| | | |
|---|---|---|
| EP | 1906289 | 4/2008 |
| EP | 2077473 | 7/2009 |
| EP | 2 380 709 A2 | 10/2011 |
| EP | 2592812 | 5/2013 |
| EP | 2801935 | 11/2014 |
| EP | 2 927 854 A1 | 10/2015 |
| EP | 2 942 717 A1 | 11/2015 |
| EP | 2940544 | 11/2015 |
| EP | 3 018 597 | 5/2016 |
| EP | 3 032 480 A1 | 6/2016 |
| EP | 3 037 901 | 6/2016 |
| EP | 3 076 253 A1 | 10/2016 |
| EP | 3 086 193 A1 | 10/2016 |
| JP | 2008-201101 A | 9/2008 |
| JP | 2016-010145 A | 1/2016 |
| WO | 2016/057386 A1 | 4/2016 |

OTHER PUBLICATIONS

Rockwell Automation. The Power of Collaboration Working for you: PartnerNetwork Solutions from Rockwell Automation; Win-911 Software; Publication ENCOMP-BR007B-EN-P—Dec. 2013.

Extended European Search Report for EP Patent Application Serial No. 17150085.3-1802 dated May 10, 2017, 8 pages.

Non-Final Office Action for U.S. Appl. No. 14/675,129, dated May 4, 2017, 58 pages.

Extended European Search Report for EP Patent Application Serial No. 16161305.4, dated Sep. 5, 2016, 10 pages.

European Office Action for EP Patent Application Serial No. 16161305.4, dated Oct. 10, 2016, 2 pages.

Office Action for U.S. Appl. No. 15/241,354 dated Jan. 24, 2018, 95 pages.

Microsoft HoloLens demo onstage at BUILD 201, https://www.youtube.com/watch?v=3AADEqLIALk, 2 pages, publ. Apr. 29, 2015, accessed Mar. 9, 2018.

European Office Action for EP Patent Application Serial No. 16196582.7, dated Feb. 14, 2018, 7 pages.

European Office Action for EP Patent Application Serial No. 17150085.3, dated Dec. 19, 2017, 5 pages.

Extended European Search Report for EP Patent Application Serial No. 17178555.3 dated Jan. 8, 2018, 73 pages.

Communication Pursuant to Article 94(3) EPC Received for EP Patent Application No. 16161305.4 dated Sep. 8, 2017, 7 pages.

Extended European Search Report for EP Patent Application Serial No. 17178556.1-1871 dated Aug. 23, 2017, 10 pages.

Extended European Search Report for EP Patent Application Serial No. 17186540.5-1958 dated Sep. 28, 2017, 8 pages.

European Office Action for EP Patent Application Serial No. 16196582.7, dated May 9, 2017, 2 pages.

Final Office Action for U.S. Appl. No. 14/675,129, dated Dec. 1, 2017, 63 pages.

Extended European Search Report for European Application Serial No. 17200391.5 dated Jan. 18, 2018, 7 pages.

Non-Final Office Action for U.S. Appl. No. 15/391,213, dated May 9, 2018, 80 pages.

Communication pursuant to Rule 69 EPC for EP Patent Application Serial No. 17186540.5 dated Apr. 4, 2018, 2 pages.

Communication pursuant to Rule 69 EPC for EP Patent Application Serial No. 17178556.1 dated Feb. 26, 2018, 2 pages.

Communication pursuant to Rule 69 EPC for EP Patent Application Serial No. 17178555.3 dated Feb. 26, 2018, 2 pages.

Extended European Search Report for European Application Serial No. 17200575.3 dated Apr. 17, 2018, 8 pages.

Extended European Search Report for European Application Serial No. 17200580.3 dated Apr. 17, 2018, 8 pages.

Chinese Office Action for Chinese Application Serial No. 201610187424.2 dated Mar. 9, 2018, 6 pages.

Non-Final Office Action received for U.S. Appl. No. 15/170,676, dated May 24, 2018, 163 pages.

Communication pursuant to Rule 69 EPC for EP Patent Application Serial No. 17200575.3 dated May 22, 2018, 2 pages.

Communication pursuant to Rule 69 EPC for EP Patent Application Serial No. 17200580.3 dated May 22, 2018, 2 pages.

Non-Final Office Action received for U.S. Appl. No. 14/987,399 dated Jun. 1, 2018, 83 pages.

Final Office Action received for U.S. Appl. No. 15/241,354, dated Jul. 11, 2018, 80 pages.

Non-Final Office Action received for U.S. Appl. No. 15/240,161, dated Jul. 27, 2018, 54 pages.

Non-Final Office Action for U.S. Appl. No. 15/465,246 dated Jan. 24, 2019, 411 pages.

Communication pursuant to Rule 94(3) EPC for EP Patent Application Serial No. 17186540.5 dated Feb. 21, 2019, 5 pages.

Non-Final Office Action for U.S. Appl. No. 15/718,856 dated Mar. 5, 2019, 68 pages.

Final Office Action for U.S. Appl. No. 15/391,213, dated Oct. 25, 2018, 67 pages.

Non-Final Office Action for U.S. Appl. No. 15/391,260, dated Nov. 30, 2018, 78 pages.

Final Office Action received for U.S. Appl. No. 15/170,676, dated Dec. 26, 2018, 46 pages.

Non-Final Office Action for U.S. Appl. No. 15/718,907, dated Dec. 14, 2018, 75 pages.

Chinese Second Office Action for Chinese Application Serial No. 201610187424.2 dated Sep. 4, 2018, 11 pages (including English Translation).

Non-Final Office Action received for U.S. Appl. No. 15/170,676 dated May 13, 2019, 36 pages.

Final Office Action received for U.S. Appl. No. 15/718,856 dated May 24, 2019, 27 pages.

Communication pursuant to Article 94(3) EPC received for EP Patent Application Serial No. 17200575.3 dated Apr. 5, 2019, 5 pages.

Extended European Search Report received for EP Patent Application Serial No. 18205904.8 dated Apr. 3, 2019, 11 pages.

Makris et al., "Augmented reality system for operator support in human-robot collaborative assembly", CIRP Annals—Manufacturing Technology, vol. 65, No. 1, May 12, 2016, pp. 61-64.

Communication pursuant to Rule 69 EPC received for EP Patent Application Serial No. 18205904.8 dated May 20, 2019, 2 pages.

Final Office Action received for U.S. Appl. No. 15/391,260 dated Jun. 12, 2019, 56 pages.

Notice of Allowance received for U.S. Appl. No. 16/165,360 dated Jun. 11, 2019, 49 pages.

\* cited by examiner

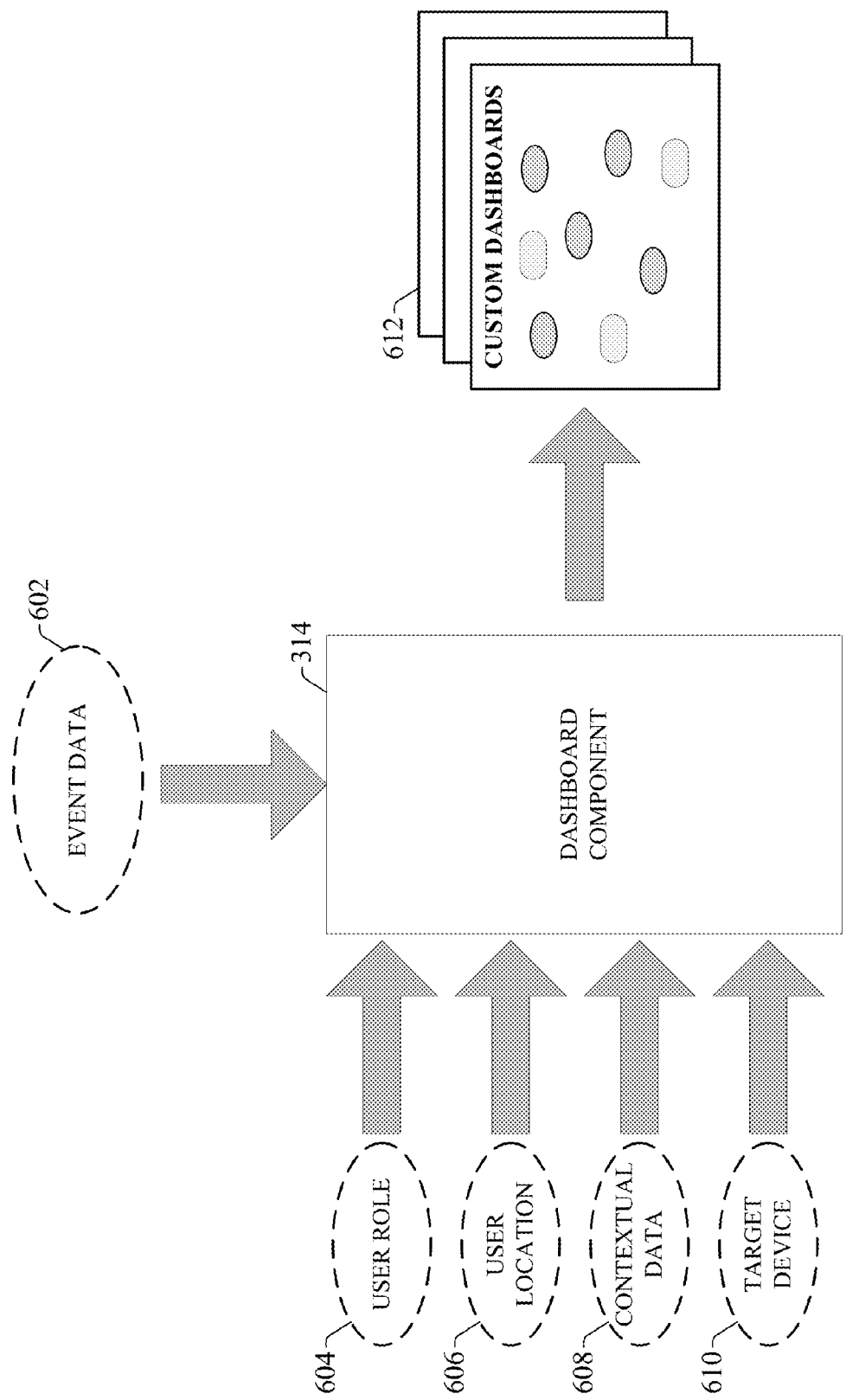

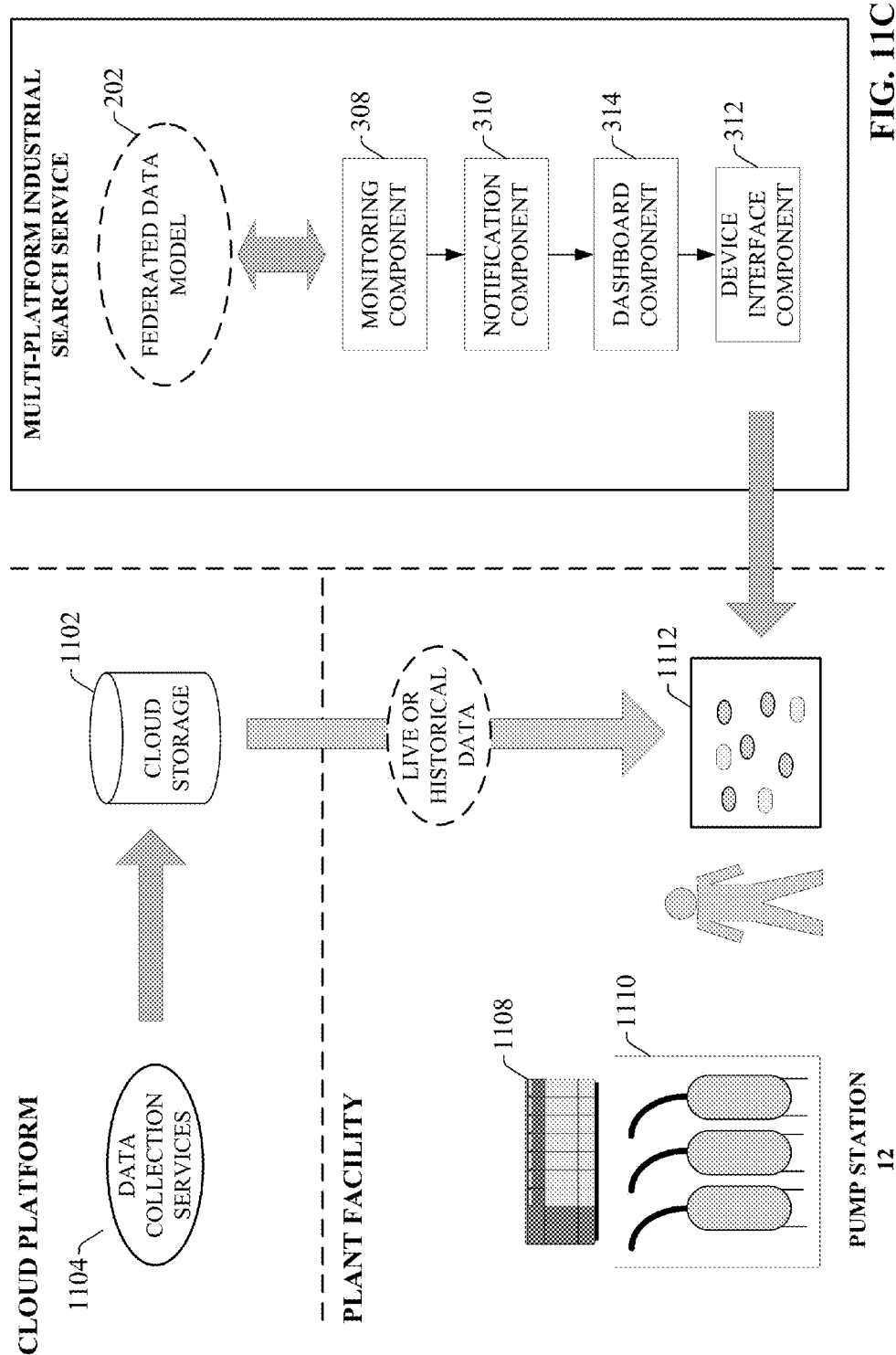

AUTOMATED CREATION OF INDUSTRIAL DASHBOARDS AND WIDGETS

BACKGROUND

The subject matter disclosed herein relates generally to industrial automation systems, and, more particularly, to a dynamic search engine capable of delivering customized information presentations to selected recipients in response to detected events within an industrial environment.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for generation and delivery of industrial dashboards is provided, comprising a monitoring component configured to determine that one or more industrial data items maintained in a federated data model satisfy a criterion defined by a monitoring rule indicative of a performance issue relating to an industrial asset; a notification component configured to identify a user to be notified of the performance issue and a user role associated with the user; and a dashboard component configured to generate a visualization window for presentation of data relating to the performance issue based on the user role and a location of the user within an industrial environment.

Also, one or more embodiments provide a method for generating a visual notification of an industrial event, where the method comprises determining, by a system comprising a processor, that one or more industrial data items indexed in a federated data model indicate occurrence of an event by an industrial automation system for which attention is required; selecting, by the system, a recipient for a notification of the event; generating, by the system, a dashboard graphic that renders event data relating to the event based on a role associated with the recipient and a location of the recipient relative to the industrial automation system; and sending, by the system, the dashboard graphic to a client device associated with the recipient.

Also, according to one or more embodiments, a non-transitory computer-readable medium is provided having stored thereon instructions that, in response to execution, cause a system to perform operations, the operations comprising determining that one or more industrial data items indexed in a federated data model satisfy a criterion indicative of a performance issue relating to an industrial asset; selecting a recipient for a notification of the performance issue; generating a dashboard display that renders event data relating to the performance issue based on a role associated with the recipient and a location of the recipient relative to a source of the performance issue; and sending the dashboard display to a client device associated with the recipient.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 6 is a generalized block diagram illustrating generation of custom dashboards by a dashboard component.

FIG. 11A-11C are diagrams illustrating dynamic selection of a data source.

DETAILED DESCRIPTION

Figure 1:
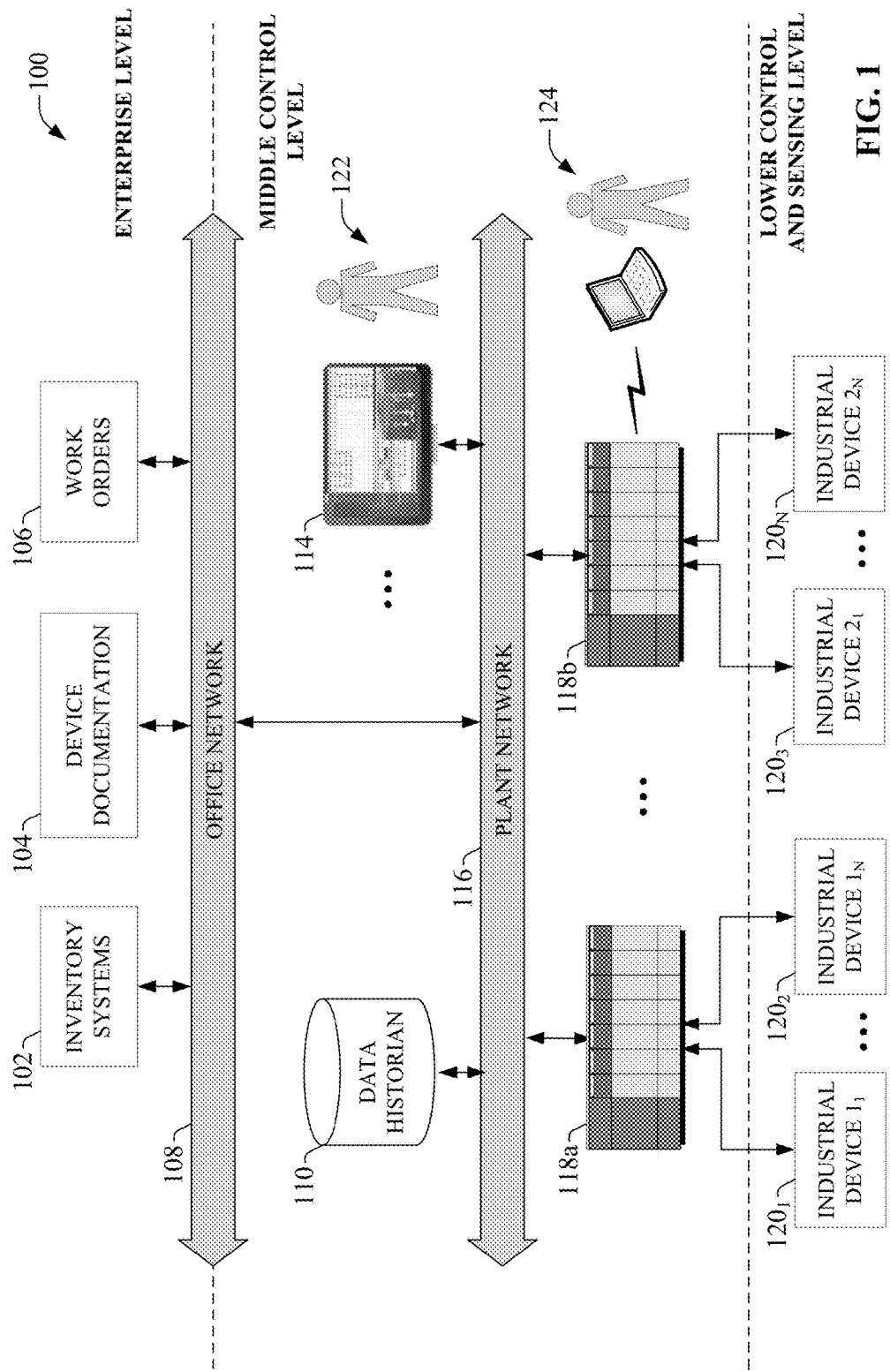
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or a hybrid device that combines controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Industrial controllers 118 and HMIs 114 comprise two sources of information relating to the industrial processes and systems being controlled within the plant environment. Since HMIs 114 leverage data from industrial controllers 118 to facilitate visualization of the controlled systems, both the industrial controllers 118 and the HMIs 114 may contain information relating a common aspect of the industrial systems. For example, the control programming (e.g., ladder logic, sequential function chart, etc.) for controlling operation of a particular tank used in a batch process may execute on one of the industrial controllers 118, while the operator interface screens for viewing a graphical representation of the tank's current status and relevant setpoints (e.g., level set-points, maximum flow set-points, etc.) may be viewed on one of the HMIs 114. However, since these two sources of information are segregated cross two different data sources and platforms, operators and maintenance personnel are typically only able to view one source of information at a time. That is, operators may choose to view the operator interface screens for the tank of interest on the relevant HMI terminal (see operator 122), or may connect a personal computing device (e.g., a laptop computer) to the industrial controller to view the control programming used to control the tank's operation (see operator 124). In most cases, the operator must be in physical proximity to either the HMI terminal or the industrial controller in order to view the information on that particular data source. Consequently, during troubleshooting of maintenance issues involving the tank, personnel must travel to the source of the information (e.g., the HMI terminal or industrial controller, which are often located near the physical machine being controlled) and locally search each of the HMI and the industrial controller individually.

Some industrial environments may also include other sources of potentially relevant information relating to specific aspects of the controlled industrial systems. These may include, for example, a data historian 110 that aggregates and stores production information collected from the industrial controllers 118 or other data sources, or a device documentation store 104 containing electronic documentation for the various industrial devices making up the controlled industrial systems. Other information sources may include an inventory tracking system 102, a work order management system 106, repositories for machine or process drawings and documentation, vendor product documentation storage, vendor knowledgebases, internal knowledgebases, or other such systems, some or all of which may reside on an office network 108 of the industrial environment. These diverse information sources are spread across many locations and systems both within the plant environment and externally (e.g., on the Internet). When diagnosing problems, maintenance personnel are often required to search several of these sources of information individually, using several different software packages specific to the respective data sources being searched. Moreover, searching for information pertaining to a particular device or machine often requires an extensive knowledge of the overall industrial system in order to locate the data source (e.g., industrial controllers, HMIs, etc.), to be searched, as well as to identify the relevant operator screens and control program routines. Individually searching each of these data sources in connection with solving a system downtime issue or other problem can delay correction of maintenance issues, resulting in lost revenue and scheduling problems. Also, if an operator or maintenance personnel is not near an information source—such as an HMI terminal—at the time an operational or maintenance issue occurs, the user may not be made aware of the issue in a timely fashion.

To address these and other issues, one or more embodiments of the present disclosure provide a multi-platform industrial search and notification system that performs automated and manually initiated information searches across multiple disparate industrial data platforms. The search system is built on a search platform that unifies plant-wide control system information from multiple diverse sources under a common namespace, or federated data model. The system can monitor this federated data model for conditions that may warrant attention by plant personnel, and deliver proactive notifications and operational data to selected users via their personal devices. The system can customize presentation of this data based on the user's role, location, and/or other contextual information. To this end, the system can automatically generate user-specific and context-specific dashboards, widgets, or other visualizations, and render these custom visualizations to the user at appropriate times. This eliminates the need to manually pre-build dashboards for each scenario or user role. That is, rather than requiring users to select from among a set of preconfigured dashboards and widgets prepared by a system administrator, the multi-platform search and notification system described herein can generate customized dashboards, and proactively push these dashboards to appropriate users' client devices at appropriate times (e.g., when a maintenance issue is detected, when the user is viewing a particular area of the plant, etc.).

Figure 2:
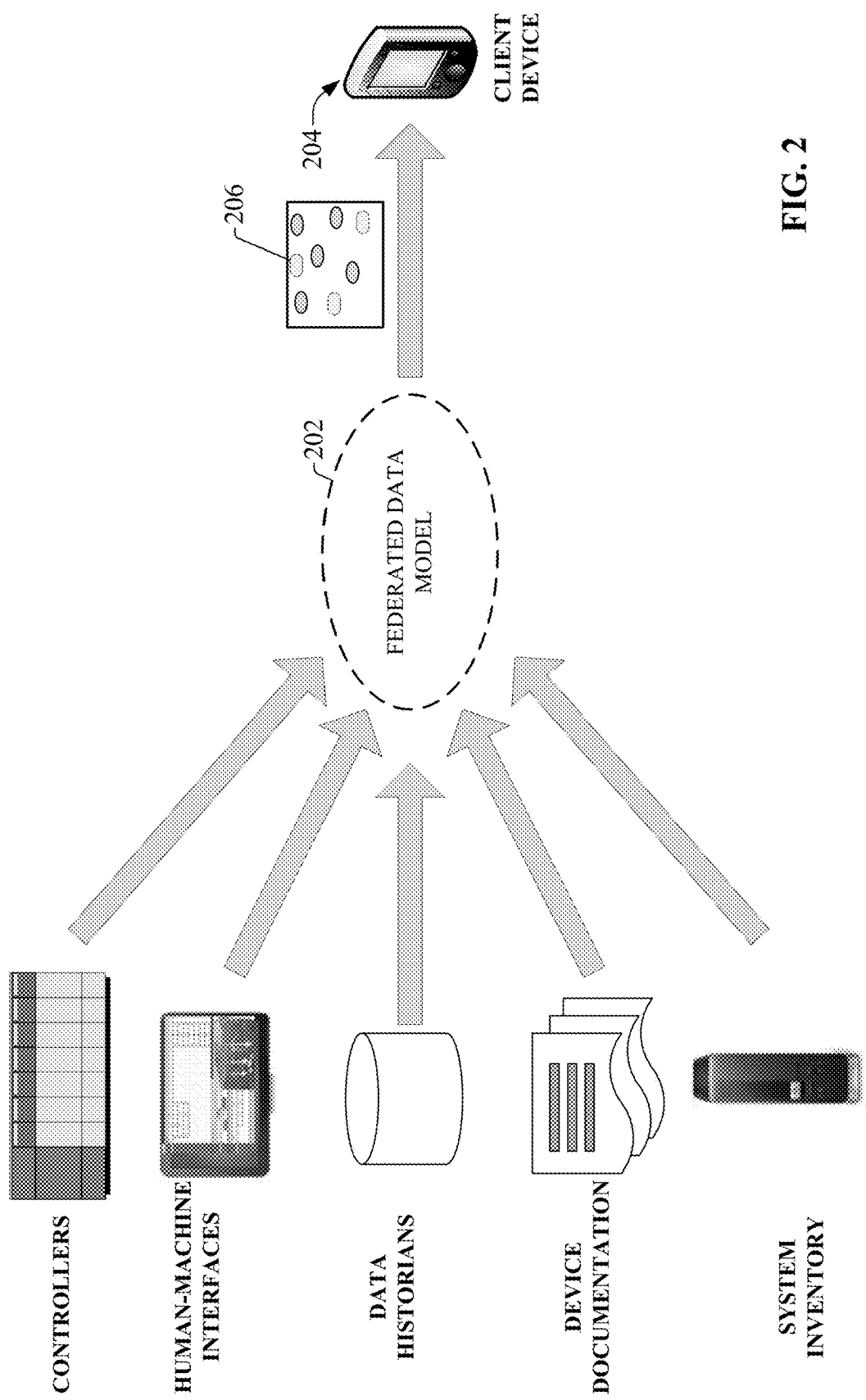
FIG. 2 is a conceptual diagram illustrating federation of industrial data by the indexing system.

FIG. 2 is a conceptual diagram illustrating federation of industrial data by the indexing system. In one or more embodiments, the multi-platform industrial search engine indexes data from multiple sources both across the industrial facility and external to the facility, including but not limited to industrial controllers, HMIs, data historians, device and system documentation repositories (e.g., drawings, manuals, knowledgebase articles, etc.), system inventory management systems, and/or other such platforms. The search system indexes and correlates this multi-platform data to yield a federated data model 202 that can be accessed and searched by a client device 204, or by a monitoring component that performs automated searches of the model in order to provide proactive notifications via customized dashboards and widgets.

In an example scenario, a monitoring component can perform dynamic automated searches of federated data model 202 in order to identify conditions indicative of a new or eminent performance or maintenance issue. With a plant's industrial data indexed in the federated search model, one or more dynamic search engines can be configured to access the model automatically in the background to quickly identify issues requiring attention. When a maintenance or operational issue requiring attention is detected, the system can collect information about the issue and generate a user-specific and context-specific dashboard 206 for delivery to client device 204, where the dashboard conveys data relevant to the detected issue presented in a format tailored to the user's role, location, or other contextual conditions. Such notifications can be sent to one or more plant employees determined to be suited to address the detected issue based on a record of the employees' skills, locations relative to the source of the issue, and/or availability.

Alternatively, client device 204 may submit a search request for a particular data tag (e.g., Tank 1) to the federated data model 202. Based on the indexed plant-wide information recorded in the model, the industrial search system can locate all instances of the specified data tag across the disparate data sources and deliver a custom dashboard 206 identifying all discovered instances categorized according to data platform.

Figure 3:
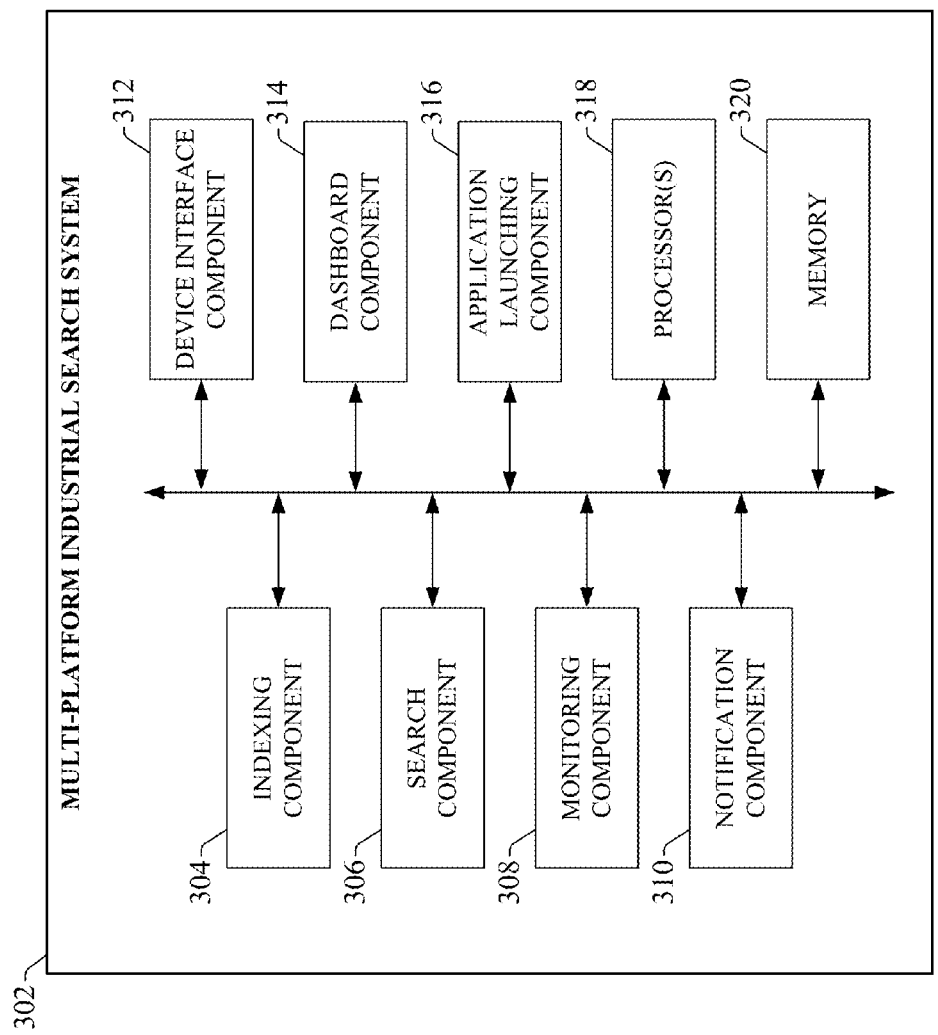
FIG. 3 is a block diagram of an example multi-platform industrial search system.

FIG. 3 is a block diagram of an example multi-platform industrial search system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Multi-platform industrial search system 302 can include an indexing component 304, a search component 306, a monitoring component 308, a notification component 310, a device interface component 312, a dashboard component 314, an application launching component 316, one or more processors 318, and memory 320. In various embodiments, one or more of the indexing component 304, search component 306, monitoring component 308, notification component 310, device interface component 312, dashboard component 314, application launching component 316, the one or more processors 318, and memory 320 can be electrically and/or communicatively coupled to one another to perform one or more of the functions of the multi-platform industrial search system 302. In some embodiments, components 304, 306, 308, 310, 312, 314, and 316 can comprise software instructions stored on memory 320 and executed by processor(s) 318. Multi-platform industrial search system 302 may also interact with other hardware and/or software components not depicted in FIG. 3. For example, processor(s) 316 may interact with one or more external user interface devices, such as a keyboard, a mouse, a display monitor, a touchscreen, or other such interface devices.

Indexing component 304 can be configured to gather information about an industrial automation system and to generate a federated data model defining locations and sources of data items throughout the industrial system, as well as relationships between the data items. For example, some embodiments of indexing component 304 may be configured to deploy a crawler entity that traverses a plant network and discovers the data items and their interdependencies. The resulting indexing information generated by the crawler can be returned to the indexing component 304, which builds a searchable federated data model (e.g., federated data model 202) capable of identifying and reporting sources of specific data items or tags, as well as relevant contextual data relating to a specified data item.

Search component 306 can be configured to submit search queries to the federated data model and retrieve search results identifying locations of requested data items throughout the industrial system. Search component 306 can be configured to classify the search results according to the platform of the respective data sources on which the results were found (e.g., control logic, HMI, etc.), as well as the network and/or physical location (e.g., production area) in which the information is located. For search results corresponding to web content (e.g., vendor knowledgebase websites), the search component 306 can generate links that facilitate direct navigation to the web content.

Monitoring component 308 can be configured to monitor the indexed data items for defined trigger conditions, and to submit automated queries to the federated data model in response to detection of a trigger condition. The defined trigger conditions can correspond to conditions indicative of a performance or operational issue relating to the industrial system (e.g., a downtime condition, an abnormal condition, a current or predicted non-optimal operation condition, etc.). Notification component 310 can be configured to send notifications to one or more selected recipients in response to detection of a trigger condition by monitoring component 308. The notification can include additional information about the performance issue corresponding to the trigger condition, where the additional information is retrieved from the federated data model based on the automated search query submitted by the monitoring component 308 in response to the trigger.

Device interface component 312 can be configured to exchange information between the multi-platform industrial search system 302 and a client device having authorization to access the system. For example, the device interface component can receive search queries from the client device for submission to the federated data model, as well as deliver search results and notifications to the client device.

Dashboard component 314 can be configured to generate a customized dashboard (or widget) in response to issues detected by notification component 310, and deliver this customized dashboard to one or more client devices associated with selected relevant users. The dashboards can filter and format relevant data gathered by the notification component based on the user's role (e.g., maintenance personnel, operator, engineer, finance, etc.), location, or other contextual data determined based on a search of the federated data model.

Application launching component 316 can be configured to remotely launch industrial control program applications on a target device, such as an HMI terminal. The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
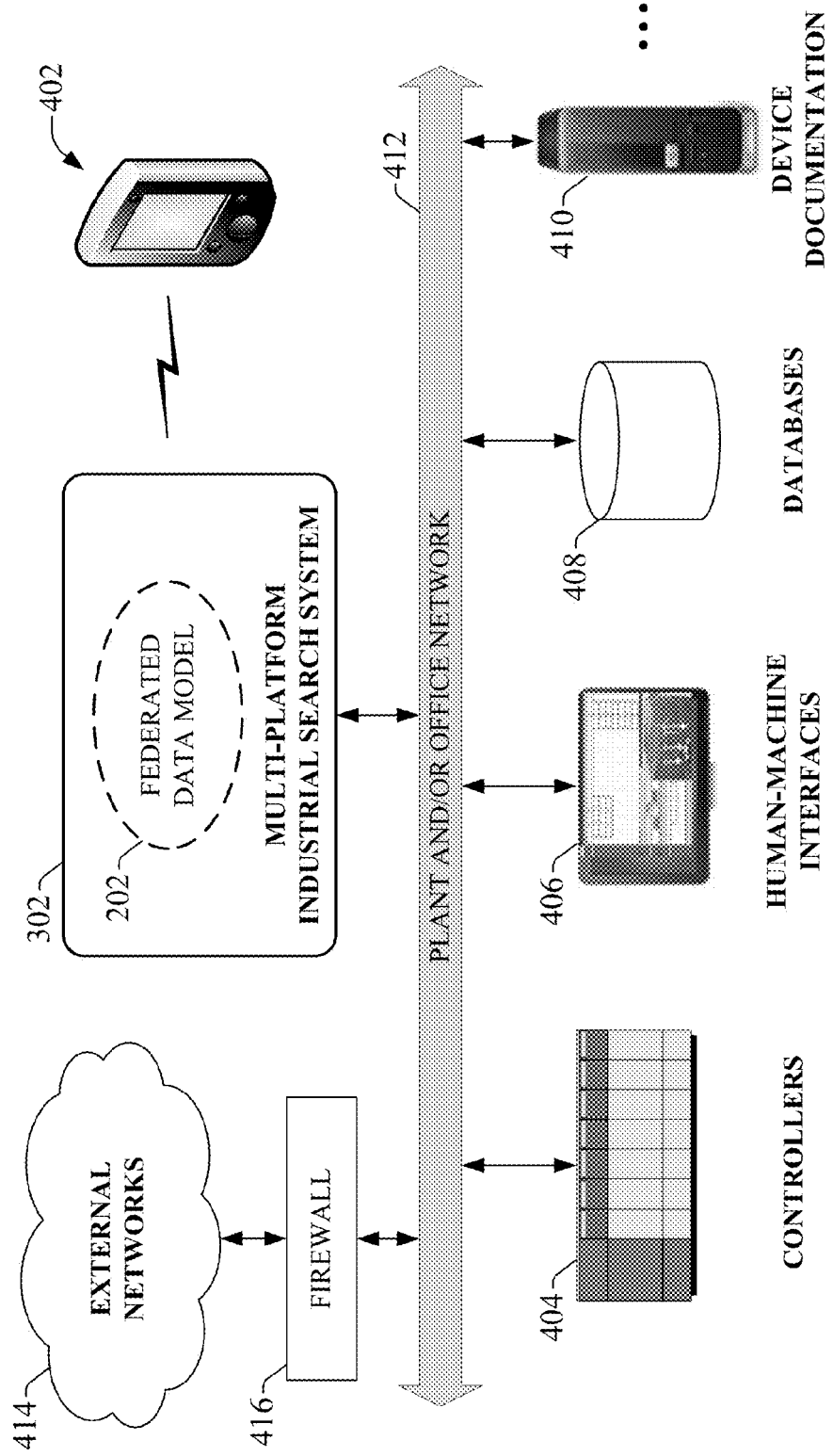
FIG. 4 is a block diagram of a generalized example architecture including a multi-platform industrial search system that discovers and indexes multi-platform data throughout an industrial environment.

FIG. 4 is a block diagram of a generalized example architecture including a multi-platform industrial search system 302 that discovers and indexes multi-platform data throughout an industrial environment. The example industrial environment depicted in FIG. 4 includes one or more industrial controllers 404, HMIs 406, databases 408 (e.g., data historians, employee databases, inventory databases, etc.), and device documentation repositories 410. The industrial environment may also include other sources of industrial data not depicted in FIG. 4, including but not limited to product inventory tracking systems, work order management systems, etc. Data sources 404-410 reside on a plant and/or office network 412. In some scenarios, data sources 404-410 may be distributed across multiple networks within the plant facility; e.g., a plant network and an office network communicatively connected through a firewall device or other network infrastructure device. Network 412 may also have access to external networks 414 such as the Internet (e.g., via firewall 416).

Multi-platform industrial search system 302—which also resides on network 412 in this scenario—discovers and indexes data items that are available in the disparate data sources 404-410 as well as on the external networks 414. The system also indexes relationships between the data items. This can include, for example, recording instances of the same data item residing in multiple data sources (e.g., recording that a data tag corresponding to a particular temperature measurement within one of the industrial controllers 404 corresponds to a data tag within one of the HMIs 406 for displaying the temperature measurement on a display screen), observing that values of certain data items are a function of other data items (e.g., an output coil associated with a first data tag in a ladder logic program is set based on a value of a second data tag used as an output condition for the rung), or other such relationships. In this way, the multi-platform industrial search system 302 automatically inventories a customer's industrial environment by discovering the industrial assets in use and their associated available data items. Search system 302 can also discover relevant data on data sources residing on the external networks 414, including but not limited to device or machine vendor documentation, relevant online knowledgebase articles, vendor product release information, etc.

The search system 302 records the indexed information (that is, the discovered plant-wide data items and their relationships) as a federated data model 202, which can be remotely accessed and searched by a client device 402 to locate desired data items, or by a dynamic search engine for delivery of automated and/or proactive notifications and dashboards to client device 402. Client device 402 can be any mobile device (e.g., mobile phone, laptop computer, tablet computer, wearable computer, etc.) or fixed location computer (e.g., desktop computer, server, operator interface, etc.) capable of remotely accessing search system 302. In some embodiments, multi-platform industrial search system 302 may be implemented on a web server, allowing client device 402 to access the federated data model via an Internet connection. The search system 302 may also be implemented on a networked local server accessible by the client device 402 via a wireless network connection. In yet another scenario, the search system 302 may be implemented on a cloud platform, where the search system executes as a cloud-based service.

In various embodiments, the federated data model 202 can be manually searched by a user, or can be monitored automatically by the search system in order to automatically detect issues throughout the plant that may require the attention of plant personnel. In response to detection of an issue or event, the system can identify one or more users who should be notified of the event and generate a customized dashboard for each user designed to visualize the issue to that user. The system customizes each dashboard based on such factors as the nature of the issue, the role of the target user, the user's current location, the type of client device associated with the user, contextual information obtained from the federated data model (e.g., a current alarm condition, a current state of one or more relevant machines, etc.). The dashboards can be designed to visualize a selected subset of data maintained in the federated data model or other data sources, filtered and formatted in accordance with the user-specific and context-specific factors. Once generated, the system can deliver the dashboards and associated data to the respective client devices, thereby notifying the users of the detected event. In some embodiments, the system can also generate and deliver customized dashboards in response to other types of events, such as in response to a determination that the user is viewing a particular machine or area of the plant.

Figure 5:
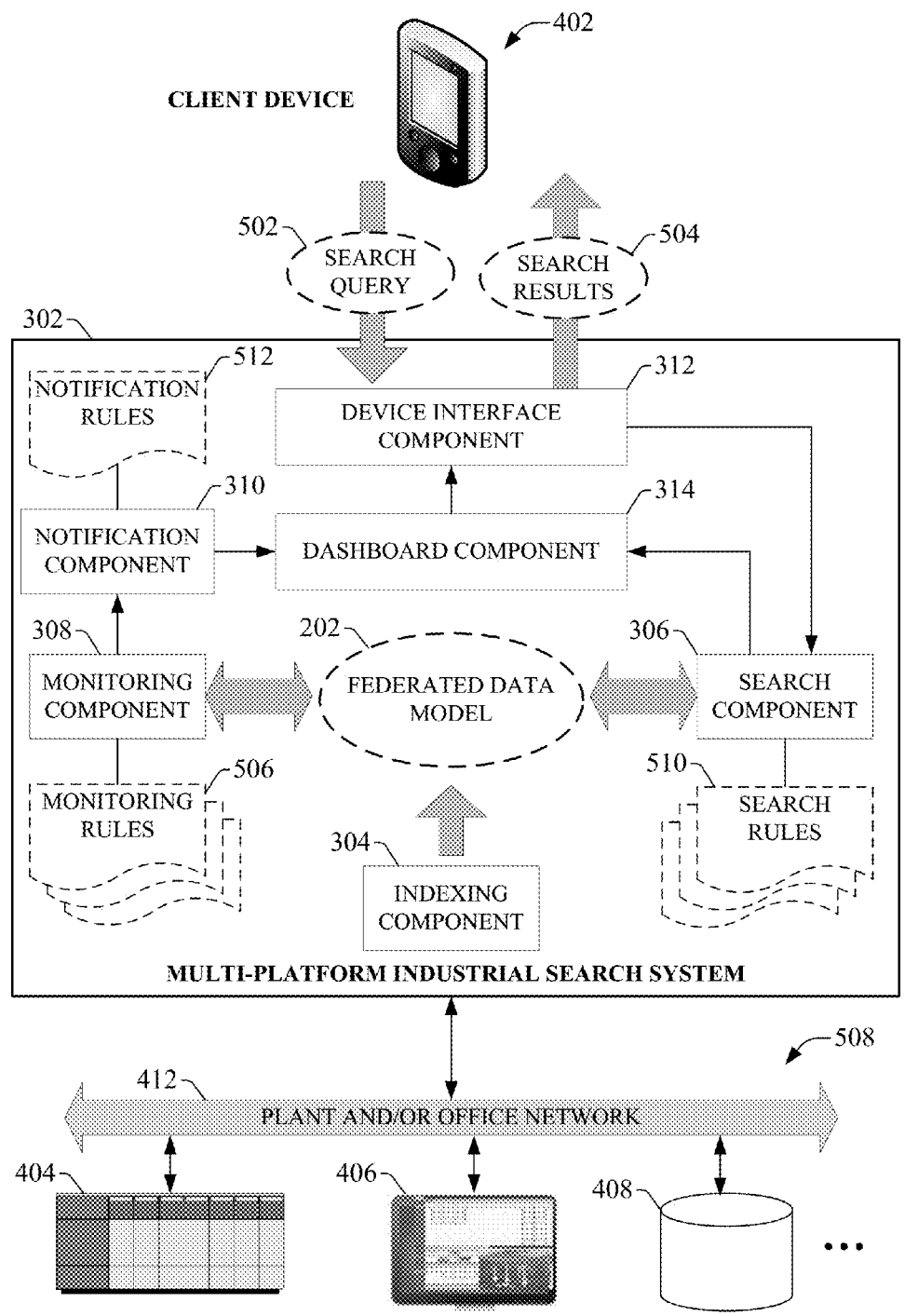
FIG. 5 is a block diagram illustrating components of the multi-platform industrial search system.

FIG. 5 is a block diagram illustrating components of the multi-platform industrial search system in more detail. In some embodiments, the search system may be implemented on a server or other computing device that resides on plant and/or office network 412. In other embodiments, the search system 302 may be implemented on a web server, allowing client devices to remotely search the federated data model 202 via a web connection. In still other embodiments, the search system may be implemented as a cloud-based service that executes on a cloud platform, as will be discussed in more detail herein.

Multi-platform industrial search system 302 includes an indexing component 304 that collects information about available data items distributed across a customer's industrial environment, and generates a federated data model 202 representing a searchable unified view of the discovered data. The indexing component 304 is configured to discover data items on multiple disparate platforms, including but not limited to industrial controllers 404, HMIs 406, databases 408, electronic documentation libraries, inventory tracking systems, work order management systems, etc. In some embodiments, indexing component 304 can discover available data items by deploying discovery agents on network 412. These agents can traverse network 412 and identify devices in use throughout the plant, as well as the data items or tags, applications, and configuration information associated with those devices. Since a given industrial environment typically comprises a heterogeneous collection of devices of different types and vendors, and the data made available by these devices may comprise many different data types (e.g., controller tags, HMI tags, alarms, notifications, events, etc.), indexing component 304 can manage and deploy device-specific or platform-specific agents configured to extract and analyze information from specific types of devices or data platforms (e.g., controllers, HMIs, etc.). Some device-specific agents can be configured to locate application project files stored on particular device types (e.g., configuration and/or program files on an industrial controller, screen configuration files on an HMI, etc.), and extract relevant information about the devices based on analysis of data contained in these project files. By leveraging device-specific and platform-specific agents, the indexing component 304 can discover and index data conforming to many different formats and platforms.

In order to unify this disparate heterogeneous data under a common platform for collective searching, the device-specific agents can transform the collected data to a format understandable by the indexing component 304 (e.g., extensible markup language or other format), and the indexing component 304 can index this transformed data using a common indexing format compatible with the common search platform. The indexing component 304 then encodes this normalized representation of the discovered data in the federated data model 202. By unifying the distributed data under this unified search platform, the system can allow client devices to search the plant-wide data without knowledge of the rules or protocols for reading the various data source platforms (e.g., industrial controllers, HMIs, etc.)

In addition to discovery of devices and their associated data via crawling of the plant network, some embodiments of indexing component 304 can also be configured to receive uploaded configuration information from devices that support self-identification functionality. In such scenarios, industrial devices (e.g., motor drives, industrial controllers, HMI terminals, etc.) that support self-identification to the multi-platform industrial search system can be configured to auto-discover the search system when the device is deployed (e.g., when the device is placed on the plant network). For example, the device may be pre-configured with the identification of the industrial search system to which the device is to provide its identity and configuration information (e.g., a name associated with the search system, a machine identifier, a cloud or web address, etc.), or may be configured to perform a search of the plant network for compatible industrial search systems that may be present on the network. Upon discovery of the search system, the device can then package and send relevant information about the device and its available data to the indexing component 304, which integrates the reported data items in federated data model 202. The information delivered by the device can include, for example, an identity of the device, the device's type and revision, available data items or tags, known contextual information (e.g., the device's location within the plant environment), or other relevant information.

Indexing component 304 can also discover and record relationships—both explicit and inferred—between discovered data items. In some embodiments, the indexing component 304 may record these relationships by tagging discovered data items and building the search index based on these tags, such that related data items share common tags. In some scenarios, these tags may be explicitly defined by a system developer such that the indexing component determines which predefined tags should be applied to newly discovered data items. The indexing component 304 may also auto-generate tags for a given data item based on contextual information, including but not limited to rung comments associated with a controller tag, learned interdependencies between a newly discovered data item and a previously discovered data item (e.g., learn that Pump 5 is associated with Tank 1, and tag Pump 5 as being associated with Tank 1, or tag both Tank 1 and Pump 5 according to the larger system in which they operate), or other discovered contextual information. The indexing component 304 can associate similarly tagged data items in the federated data model 202 regardless of the platform in which they were discovered. For example, the indexing component 304 can associate common or related data items discovered, respectively, in an industrial controller, an HMI, and a data historian.

Using some or all of these techniques, the indexing component 304 can automatically build a model of the customer's industrial environment, including the disparate and multi-platform devices in use throughout the plant, their associated available data items, and relationships between these data items. This eliminates the need for plant personnel to have full knowledge of the industrial assets in use throughout the plant, since indexing component 304 can automatically inventory a given industrial environment and record discovered devices and data in federated data model 202.

Once created by the indexing component 304, federated data model 202 can be searched by monitoring component 308 and search component 306. Search component 306 is configured to search federated data model 202 in response to a search query 502 submitted by a client device 402. Client device 402 can exchange data with the multi-platform industrial search system 302 via device interface component 312, which may comprise a wired or wireless network interface, a near-field communication interface, or other such device interface suitable for the particular platform on which the search system is implemented. In some embodiments, device interface component 312 may be configured to verify an authorization of the client device 402 to access the search system prior to allowing search queries to be submitted by the client device. The device interface component 312 may authenticate the client device or its owner using password verification, biometric identification, cross-referencing an identifier of the client device with a set of known authorized devices, or other such verification techniques.

In some embodiments, the device interface component 312 may be configured to serve an interface display or search dashboard to the client device 402 when the client device requests access to the search system 302. The interface display can include interface elements that allow the user of client device 402 to manually enter and submit a search query 502 to the search system 302. For example, the display may allow the user to enter a keyword, term, or phrase as a search criterion. Example search terms may include identifiers of specific devices or machines, names of production areas within the plant, product names or codes, employee names, or other such criteria. In addition to manually entered search criteria, some embodiments of the device interface component 312 can be configured to translate barcodes or Quick response (QR) codes affixed to devices or machines. For example, a user may scan or photograph a barcode or QR code attached to a device, machine, or product (e.g., a pin-stamped or laser-etched barcode affixed to a workpiece during the production process) using client device 402, wherein the barcode contains identification information about the associated component. The client device 402 can then submit identification information extracted from the barcode to the device interface component 312 as a search criterion. In yet another example, client device 402 may extract information about an industrial device or its associated process directly from the device via near field communication (NFC) and submit the extracted information to the device interface component 312. This extracted information can include, but is not limited to, a device identifier, device status information read from a status word maintained on the industrial device, alarm data extracted from an alarm register, production statistics stored on one or more data tags, or other such information.

Upon receipt of search query 502, device interface component 312 routes the query to search component 306, which searches federated data mode 202 for content relevant to the search query. Search query 502 may comprise, for example a data tag name (e.g., Tank 1), a device or machine attribute, a device vendor, a name of a particular area of the industrial environment (e.g., a workcell or production line), a product name or identifier, or other such search criteria. Search component 306 searches the federated data model 202 for the search criteria identified by the search query 502, identifies data items corresponding to the search criteria, and returns a set of search results 504 for delivery to the client device 402. Since the search results 504 may correspond to data items found on multiple disparate platforms throughout the plant environment (e.g., industrial controllers, HMIs, device documentation repositories, etc.), the device interface component 312 can classify the results according to the platforms on which the results were found, location of the results within the plant environment (e.g., production area, workcell, etc.), or other classification criteria.

In some embodiments, search component 306 can customize the search of the federated data model 202 based on one or more defined search rules 510 defined by a system administrator. These rules may define, for example, role-specific search parameters that dictate what types of data may be provided to a given user, or how such data should be presented, based on the user's role (e.g., operator, plant engineer, plant manager, billing personnel, etc.), location, or other contextual information.

The multi-platform industrial search system can also support automated dynamic searching and notification. To facilitate dynamic notification of detected events, multi-platform industrial search system 302 includes a monitoring component 308 configured to monitor one or more performance or operational metrics of an industrial system to identify issues requiring attention by an operator or maintenance expert. In response to detection of a performance or operational issue, the monitoring component 308 can perform an automated search of federated data model 202 to collect search results relevant to the detected issue. A notification component 310 can then work in conjunction with a dashboard component 314 to deliver customized dashboard-based notifications of the detected issue together with the relevant search results to one or more client devices associated with selected plant personnel determined to be best suited to address the issue.

In an example embodiment, monitoring component 308 may monitor selected data items of industrial system 508 according to defined monitoring rules 506. Monitoring rules 506 can define, for example, which data tags of the various data platforms distributed across industrial system 508 are to be monitored, as well as criteria indicative of performance or situational issues that, when determined to be true, will trigger an automated search and personnel notification. The monitoring rules 506 can also define which employees are to be notified in response to each type of detected performance issue. As an example criterion, a monitoring rule may define that, when a temperature value associated with data tag Tank3Temp exceeds a defined setpoint value, an automated search for Tank3Temp is to be performed on federated data model 202 is to be performed. The monitoring rules may also specify one or more crucial alarm tags that, when determined to be active, require an action to be taken by maintenance personnel. The rule may also define one or more other relevant data tags to be searched in order to provide additional context for the issues. The rule can also define one or more plant employees to whom the search results are to be sent in response to detection of the issue. The rule may specify the employees explicitly (e.g., be defining one or more user identities or user-specific client devices), or may specify a category of employee (e.g., a user role or area of expertise) such that specific plant personnel associated with the defined category can be identified and notified.

When the monitoring component 308 determines—based on monitoring of the defined data items—that a criterion indicative of a performance issue has been satisfied, the monitoring component 308 generates a search query designed to collect information relevant to the detected performance or operational issue, as defined by the monitoring rules 506. This can include, for example, searching federated data model 202 for the one or more data tags or device attributes whose monitored values satisfied the defined criterion. The search may also include querying for related data items determined to be relevant to the detected performance or operational issue, including but not limited to other device statuses, telemetry values, or operator inputs that may have an effect on the data tag or device attribute being searched. These related data items may be explicitly defined by the monitoring rules for each defined performance issue, or may be dynamically identified based on the relationships between the data items defined in the federated data model 202. For example, when monitoring component 308 performs an automated search for Tank3Temp in response to detecting an excessive Tank 3 temperature, the system may locate a reference to this data tag in a rung of a controller logic program (a direct reference). The system can then identify other rungs and address within the program that affect the rung on which the Tank3Temp reference is found (indirect references). The monitoring component 308 may cycle through the indexed information recorded in the federated data model 202 multiple times in an iterative fashion until all such relationships determined to be relevant to the performance or operational issue are discovered.

When all relevant search results for a detected performance or operational issue have been collected, notification component 310 identifies one or more employees to be notified of the detected issue. The system may identify suitable recipients based on the monitoring rule definitions, as described above, or based on a separate set of notification rules 512. Notification rules 512 can comprise, for example, identities of plant personnel and their respective roles (e.g., operator, maintenance, shift supervisor, billing personnel, plant engineer, inventory manager, etc.), rules regarding which types of users or user roles should receive notifications for different categories of events, restrictions on the types of data that can be presented to each user based on the user's role, location-based restrictions on data presentation, how data should be presented for each type of user, etc. In some embodiments, the system may narrow the list of suitable recipients further based on current context information, including but not limited to each potential recipient's current location or availability, skills, training on a particular device or piece of equipment to which the notification relates, etc. For example, the search system 302 may determine each potential recipient's current location by tracking each user's respective client devices, and deliver notifications only to those users within a defined radius of the affected machine or device. The search system 302 may also interface with a separate availability tracking system that tracks each user's current availability based on work schedules, a current work activity reported by each user, or other such information.

When all eligible recipients have been identified, the notification component 310 can work in conjunction with dashboard component 314 to deliver a dashboard-based notification of the detected issue to all client devices associated with the target recipients, including the relevant data obtained from the federated data model 202. FIG. 6 is a generalized block diagram illustrating generation of custom dashboards by the dashboard component 314. As described above, upon detection of a notification event, the monitoring component 308 can perform an iterative search of federated data model 202 to identify all relevant search results and other data relevant to the detected event. This collected information, collectively referred to as event data 602, is provided to dashboard component 314, which generates for each user a custom dashboard or widget for delivery of an event notification. The dashboard for a given user may be generated based in part on the user's role 604, which may dictate which subsets of the event data 602 are to be provided to or withheld from the user. For example, if the target user is a machine operator, the dashboard component 314 may include only current operational data or alarm information on the dashboard, while omitting maintenance history data, production history data, energy consumption data, etc. from the dashboard. If the target user is a maintenance person, the dashboard may include, in addition to current operational information, maintenance history information for devices or machines relating to the event, inventory information for replacement parts that may be required to address the issue, links to documentation for device in use at the relevant area of the plant, links to external data sources (e.g., websites, knowledgebases, etc.) that may provide assistance in solving the identified issue, etc. If the user is a plant manager or shift supervisor, the dashboard may include, in addition to a notification of the event, information identifying maintenance personal capable of addressing the identified issue, as well as their current locations and availability statuses.

The user role information may also determine the types of information to be presented via the dashboard and how such information is to be presented or formatted. For example, if the user is a machine operator, the dashboard component 314 may include one or more embedded HMI screens that render graphical representations of the industrial process and associated operational or status data. Dashboards for maintenance personnel or engineers may include controls for launching a program viewer that renders the control program (e.g., ladder logic, sequential function chart, etc.) being executed by an industrial controller to control the machine or industrial system associated with the event.

The dashboard component can also leverage user location information 606 to determine whether and how a dashboard should be delivered to the user. For example, if the event data 602 relates to a downtime occurrence of a machine within a particular work area, the notification component 310 may first identify the subset of maintenance personnel qualified to work on that particular machine. The system can make this determination, for example, based on the notification rules 512, which can define associations between user identities and work jurisdictions or areas of expertise. Once this set of qualified maintenance personnel has been identified, the notification component 310 can then determine the current locations and/or availabilities of each qualified maintenance person; e.g., by tracking the locations of each user's client device, or a location tracking badge carried by the user. Based on this location information, the notification component 310 can determine which of the qualified maintenance people are within a define distance of the affected machine, and instruct the dashboard component 314 to deliver dashboards only to client devices associated with those users near the machine. In another example, the user location information 606 can determine which subsets of the event data 602 are delivered via the dashboards. For example, based on the user's current location within the plant, the dashboard component 314 can construct a dashboard that renders a subset of the event data 602 relating to the particular industrial system (e.g., machine, device, etc.) in the user's vicinity. This can include, for example, operational or status data for a machine within the user's line of sight, alarm information for the machine, maintenance history information for the machine or related devices, inventory information for replacement components corresponding to defective components on the machine, or other such information. This location-specific dashboard can allow the user to correlate the information provided via the dashboard with a visual inspection of the machine.

In some embodiments, a user's location can serve as the trigger for delivery of a dashboard to the user's client device. For example, based on tracking information collected from a wearable computer or other client device associated with the user, the system may determine that the user is viewing, or in proximity to, a particular machine or device on the plant floor. In response to this determination, the dashboard component 314 can generate a role-specific and location-specific dashboard that renders information (e.g., operational data, status data, alarm data, maintenance data, etc.) for that machine. In the case of a wearable computer, the resulting dashboard may be configured to visually overlay data items near the user's view of the devices or components to which those data items relate (e.g., superimpose an installation date for a motor controller over or near the user's view of the motor controller).

The dashboard component 314 can also customize the dashboards 612 based on other contextual data gleaned from the federated data model or other data sources, including but not limited to data sources external to the plant network and the search system. For example, if the dashboard component 314 is in the process of creating a dashboard for delivery to a user in response to a determination that the user is viewing a first workstation using a wearable computer, and there is an active alarm or downtime condition on a second upstream workstation that provides parts or materials to the first workstation, the dashboard component 314 may construct the dashboard to include status and operational information for both the first workstation and the second workstation. In making these determinations, the system can ascertain the states of both workstations, as well as identify the relationship between the two workstations, based on analysis of the plant data indexed in the federated data model. In another example, if the system determines—based on location and position information collected by tracking the user's wearable computer or other client device—that the user is viewing a particular work area, the dashboard component 314 can generate dashboard that visualizes data relating to the work area (e.g., operational and status information for devices or machines comprising the work area, a component produced at the work area, alarm information, etc.). If it is further determined that the a machine or device is experiencing a known maintenance issue at the time the user is viewing the work area, the dashboard component 314 can configure the dashboard such that information relating to the machine or device experiencing the issue is displayed more prominently on the dashboard (e.g., using color-coded or flashing alphanumeric text, by placing the relevant device data at a central location on the dashboard, etc.).

In another example, the monitoring component 308 may be configured to monitor costs of external commodities as well as the information indexed in the federated data model. In particular, the monitoring component 308 may monitor external sources of energy price data, prices of materials used in one or more industrial processes carried out within the plant, or other external commodity costs that have a bearing on production costs within the plant. The monitoring component 308 can correlate this price data with activities carried out within the plant; e.g., predict future costs of producing a particular product based on the current price of energy used to run the machines that produce the product, the amount of energy consumed by the machines in connection with making the product, a current rate of production, the current price of materials used to make the product and the amount of the material consumed to make the product at a given rate of production, etc. If the predicted costs satisfy a defined criterion—e.g., if the predicted costs or a ratio of cost to revenue exceeds a threshold, or otherwise falls outside a defined cost constraint—the notification component 310 may instruct the dashboard component 314 to construct a dashboard for notifying suitable personnel of the predicted cost concern (where the suitable personnel may include, for example, a plant manager, members of the financial department, etc.). The dashboard may include, for example, indications of the product or process affected by the energy or material prices, predicted costs associated with manufacturing the product at the current rate, or other such information. In some embodiments, an analysis component (not shown) may also simulate alternative operational scenarios for producing the product given the current energy or material prices, and present the user with alternative scenarios for manufacturing the product, or otherwise carrying out operations, in a manner that satisfies defined cost and demand constraints. For example, the analysis component may determine, based on simulations that leverage the data indexed in the federated data model, that alternating production of the product with another lower-cost product, or by limiting production of the product to only two shifts rather than three, may bring the expected production costs within the defined cost constraints while still satisfying the inventory requirements for both products. The dashboard component 314 can present these recommendations to the user via the dashboard delivered to the user's client device.

The dashboard component 314 can also customize the dashboards based on target device information 610 identifying the type of client device to which the dashboard will be delivered. For example, once the target users for a given notification event have been identified, the system can determine the types of client devices each user is currently using. This determination can be made, for example, based on explicit definitions contained in the notification rules 512 that identify the devices or target addresses to which notifications for each user are to be sent. Based on the type of device associated with the user—e.g., mobile phone, wearable computer, tablet computer, etc.—the dashboard component 314 can customize the dashboard for presentation on that type of device. For example, if a first user is using a wearable computer that displays data as an overlay on the user's field of vision, the dashboard component 314 will orient the data on the dashboard in a manner that corresponds with the user's current view (e.g., if the system determines that the user is looking at a machine or device to which the notification relates, the dashboard component 314 can overlay selected data items on or near the user's view of the machine). For a user who is to receive a similar notification but who is using a mobile phone or other handheld device, the dashboard component 314 can generate a dashboard having a ratio conforming to the ratio of the device's display screen, or that positions itself along a border of the display screen.

Figure 7A:
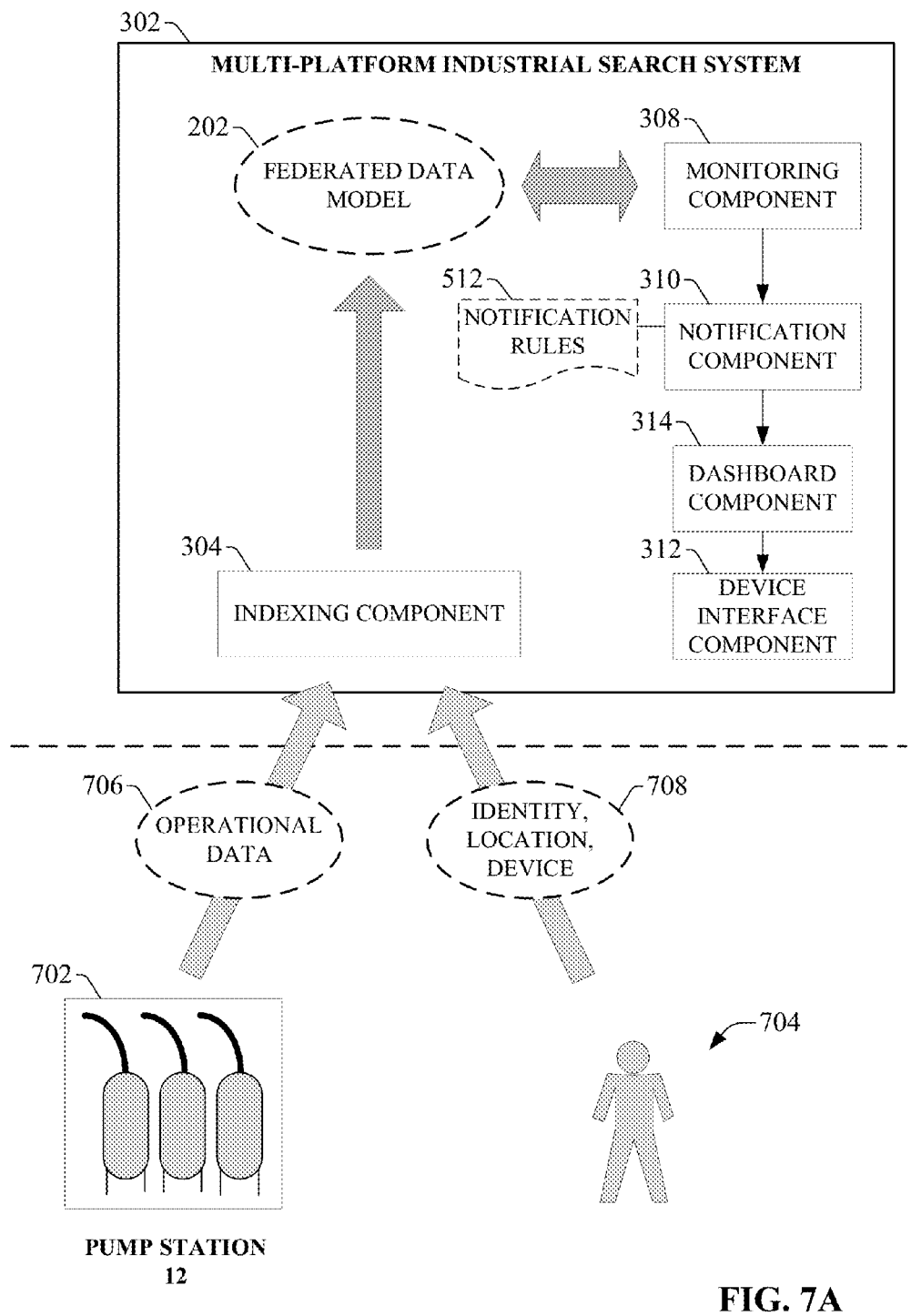
FIGS. 7A and 7B are diagrams illustrating dynamic generation and delivery of customized dashboards.
Figure 7B:
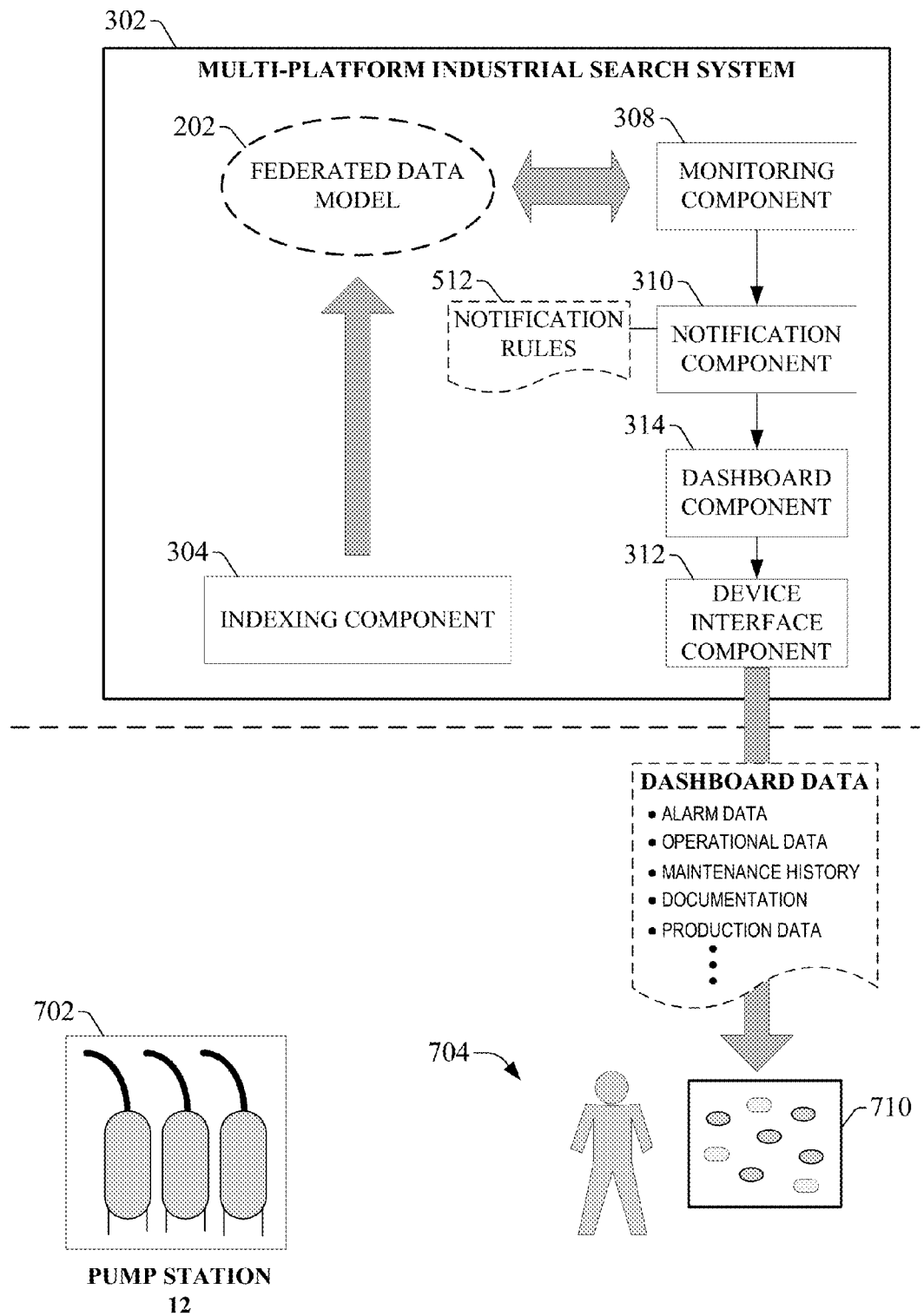

FIGS. 7A and 7B are diagrams illustrating dynamic generation and delivery of customized dashboards. As described in previous examples, indexing component 304 discovers and indexes data from multiple data sources and platforms across an industrial environment. In the present example, this includes collection operational data 706 from a particular pump station 702. This operational data can be collected by the indexing component 304 from one or more industrial controllers that interface with and control the I/O devices associated with the pump station, one or more HMI terminals that render data from the industrial controllers, or other data sources associated with the pump station. The indexing component 304 indexes this operational data 706 in the federated data model 202, or in associated data storage that is separate from the federated data model 202 but is monitored in conjunction with the plant architecture information recorded in the federated data model 202.

Concurrently with indexing of operational data 706, the indexing component 304 or a separate user monitoring component can track a user 704 as the user navigates the plant. In some embodiments, the system may track the user's location by monitoring the location of the user's personal client device (e.g., mobile handheld device, wearable computer, etc.). The user's unique client device provides the search system with user information 708 regarding the user's identity, current location, and type of client device carried by the user. The monitoring component 308 can be configured to generate a suitable dashboard for delivery to the user in response to determining that the operational data 706 and/or the user information 708 satisfy one or more notification criteria. In an example scenario, if the monitoring component 308 determines, based on the user location information, that the user is within a defined distance of pump station 702, the monitoring component 308 instructs notification component 310 to initiate sending of a customized dashboard to the user for visualization of data relating to pump station 702.

As shown in FIG. 7B, the notification component 310 can customize the notification to the user based on one or more notification rules 512, which can define which subsets of available data relating to pump station 702 may be provided to the user 704 based on the user's role and location. For example, the notification rules 512 may indicate that the user identify information associated with user 704 corresponds to an operator user role, and that operators are only to receive current alarm, status, and operational data for pump station 702. Accordingly, the dashboard component 314 may customize the resulting dashboard 710 to only render those types of data. The dashboard component 312 may also limit the data presented on the operator's dashboard based on the user's inferred line of sight of the user. For example, the system may limit presentation of available data to those subsets of data corresponding to the machines or devices within the user's inferred line of sight. Accordingly, the system may determine, based on the location and/or orientation of the user's client device, which components of pump station 702 are within the user's line of sight, and the dashboard component 314 will customize the dashboard to only present subsets of available data relating to those system components. In some embodiments, the system may determine whether a particular industrial device is within the user's line of sight based on whether a near field connection can be made between the user's client device and the industrial device.

Similarly, if the notification rules indicate that the user identity information associated with user 704 corresponds to a maintenance person, the dashboard component 314 may generate the dashboard 710 to render any or all of the current alarm, operational, and status data, as well as information relating to current maintenance activity for the pump station. This maintenance information may comprise, for example, indications of whether certain machines associated with pump station 702 are currently locked out for maintenance, digital notes tagged to selected devices or machines of the pump station by other maintenance personnel, maintenance history information for machines or devices comprising the pump station, or other such maintenance information, accumulated cycle counts for certain moving components of the pump station (which can serve as an indicator of when those components are reaching the end of their useful lifespan), or other such maintenance information. The dashboard component 314 may also customize the dashboard to include links to device documentation for one or more devices comprising pump station 702, where the documentation resides on internal documentation data stores (e.g., device documentation repository 410) or on an external documentation source (e.g., a vendor website). This maintenance and documentation information can comprise data that had been discovered by the indexing component 304 and indexed to the federated data model 202. The dashboard component 314 can also customize the format of the dashboard 710 based on the type of client device to which the dashboard will be delivered, as described in previous examples.

Although the previous example describes the system as generating and pushing the dashboard to the user's client device in response to determining that the user is within the vicinity of the pump station 702, the search and notification system can also be configured to construct and deliver dashboards to suitable users in response to other detected conditions, as described in previous examples. For example, if a machine comprising pump station 702 experiences an alarm condition requiring the attention of maintenance personnel, the monitoring component 308 will detect this condition, and notification component 310 can identify the subset of qualified maintenance personnel who are both capable of addressing the issue and currently available. The notification component 310 may also further filter the set of target uses based on the users' current locations, such that notifications are sent only to those available personnel within a defined distance from the source of the alarm conditions. Additional filtering can be performed on the available personnel based on the recorded skill levels or training associated with each potential target user. Dashboard component 314 can then generate notification dashboards for delivery to each of the target users identified by the notification component 310, with each dashboard further customized, as needed, based on each respective user's contextual information (e.g., the user's role, client device in use, location, etc.).

Other types of information that can be incorporate into the custom dashboards by dashboard component 314 can include, but are not limited to, machine or device specification data, video data streamed from video capturing devices on the plant floor and rendered on the dashboard via the search and notification system, links to web pages containing information determined to be relevant to the machine or device of interest, report data retrieved from on-premise report databases, or other types of information. In general, any of the multi-platform data discovered and indexed by indexing component 304 into the federated data model 202 can be presented to a user, in various formats, via the custom dashboards generated and delivered to the user by the system. Moreover, data contained in external data sources (that is, data sources external to the plant environment) that are accessible by the indexing component can also be integrated into the custom dashboards.

Figure 8:
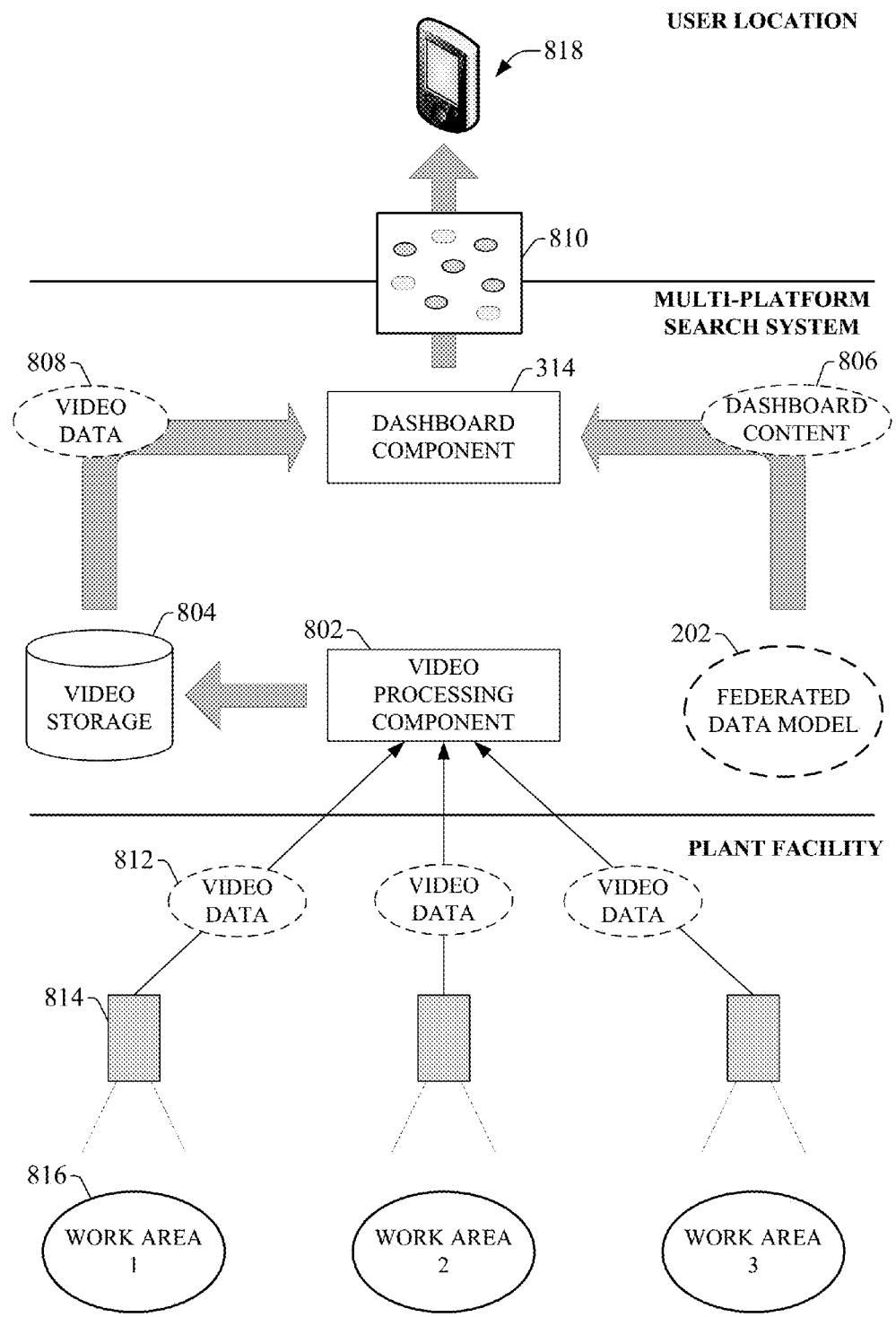
FIG. 8 is a diagram illustrating an example configuration for incorporating a video presentation into a dashboard generated by the search and notification system.

FIG. 8 is a diagram illustrating an example configuration for incorporating a video presentation into a dashboard generated by the search and notification system. In this example, a number of video capture devices 814 (e.g., digital video cameras or other types of video capture devices) are installed at various locations throughout the plant facility to capture video of respective work areas 816. The video capture devices 814 are installed on a network having access to the hardware or cloud-based platform on which the search system is implemented. Each video capture device 814 pushes video data 812 to the search system as individual video streams. A video processing component 802 associated with the search system can process and store each video stream on video storage 804, such that the video data from each camera is tagged with identification information indicating the plant facility and work area recorded by the video data.

As described in previous examples, the search and notification system can determine suitable dashboard content 806 from the federated data model 202 to be included on a custom dashboard, either in response to a search query submitted by the user via client device 818 or in response to detection of an event or condition that merits attention from the user. In this example, the dashboard component 314 is configured to add a video presentation to the dashboard. For example, the dashboard 810 provided to the user may include interactive controls that allow the user to add live or historical video data 808 as an overlay on the dashboard if such video information is available for the work area represented by the dashboard. In response to interaction with these controls, the dashboard component can overlay the video data over a selected portion of the dashboard.

Figure 9:
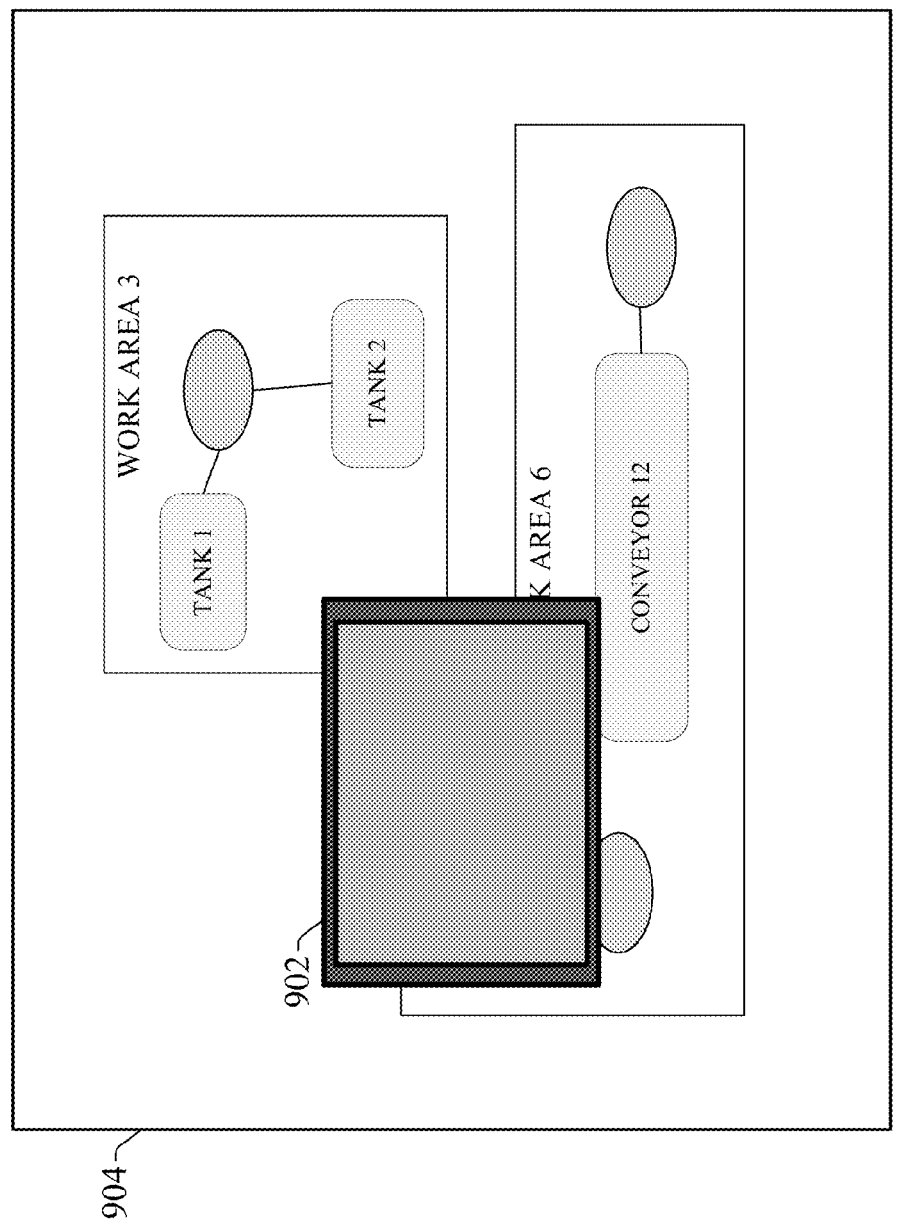
FIG. 9 is an example dashboard that includes a video window for streaming video information for a selected work area.

FIG. 9 illustrates an example dashboard 904 that includes a video window 902 for streaming video information for a selected work area. In this example, the dashboard includes a graphical representation of Work Area 6, which may include a control indicating that video is available for that area. Selection of this control causes the dashboard component 314 to overlay video window 902 on or near the Work Area 6 graphic. If the user selects a live video stream the dashboard component 314 will begin streaming the most recent video information for Work Area 6 from video storage 804 to the client device. In some embodiments, the user may also invoke a historical data stream by entering a day and time of interest via the dashboard 904. In response, the dashboard component 314 will retrieve the video data corresponding to the entered day and time, and stream this video information to the client device. Using this configuration, the user can invoke live or historical visual information for areas of interest via the search system. For example, if the dashboard indicates that an alarm condition is active for a particular machine or device, the user may invoke live or historical video in order to visually inspect the remotely via a mobile device.

Figure 10:
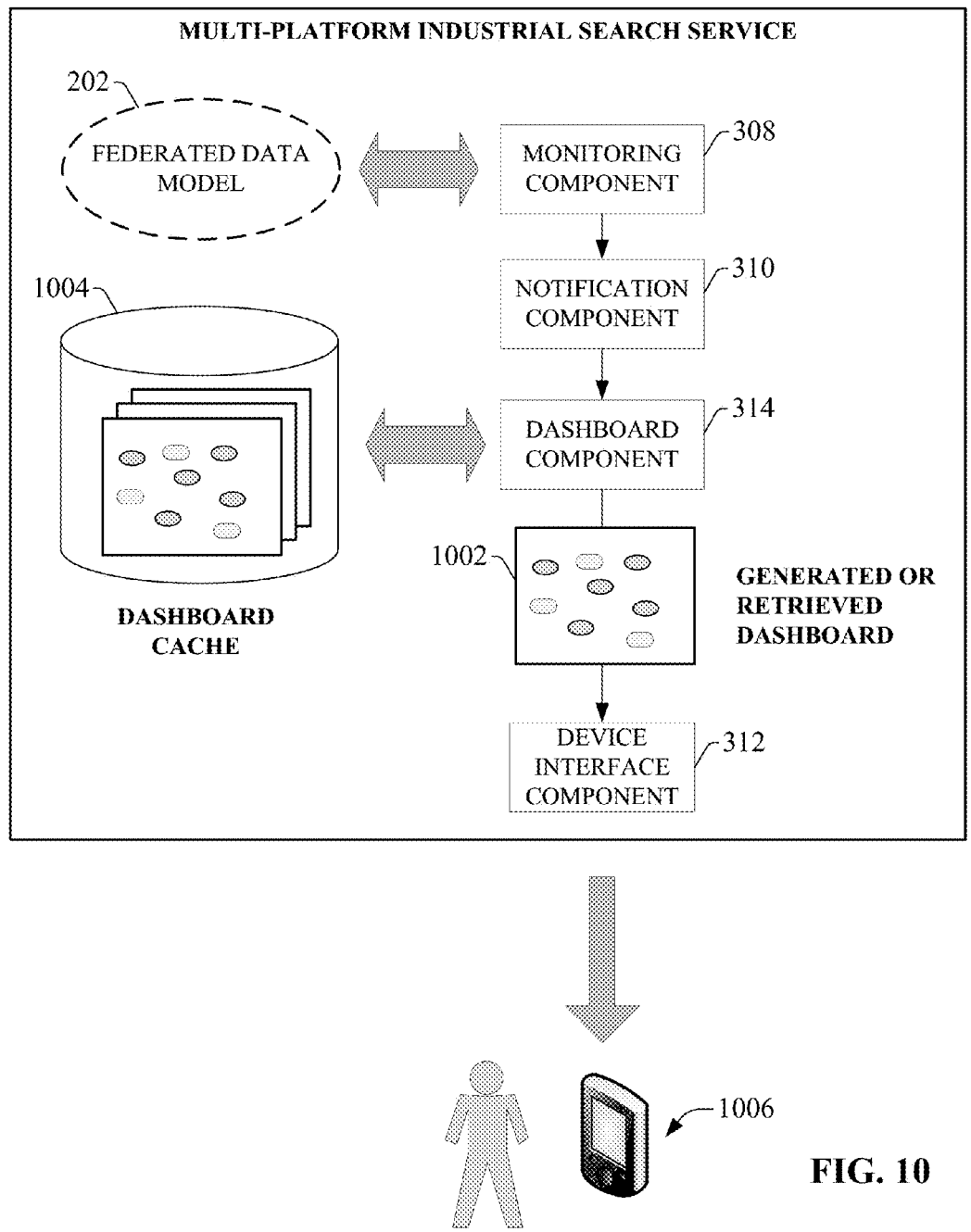
FIG. 10 is a diagram illustrating caching of dashboards.

In some embodiments, after a dashboard has been generated for delivery to a user, the system may cache the dashboard for later retrieval. FIG. 10 is a diagram illustrating caching of dashboards according to one or more embodiments. As described in previous examples, dashboard component 314 can generate a customized dashboard 1002 for delivery to a user's client device 1006 in response to notification triggers. In this example, in addition to delivering the dashboard to the client device 1006, the dashboard component 314 can also cache the dashboard in a dashboard cache database 1004 for later retrieval when a similar notification trigger occurs under a similar context. With this configuration, if a similar notification event occurs, and the notification is to be sent to the same user or another user having a similar role, the dashboard component 314 can retrieve the cached version of the dashboard rather than re-generate the dashboard dynamically.

The configuration depicted in FIG. 10 can also allow users to manually customize dashboards delivered to their client device and save the modifications on a cached version of the dashboard. For example, when a dashboard is rendered on the user's client device, the user may interact with the dashboard to remove selected elements (e.g., machine or device graphics, date items, etc.) that the user does not wish to see. The user may also rearrange elements on the dashboard as desired. The dashboard will send indications of these modifications to the dashboard component 314 (via the device interface component 312), which can save the modified dashboard in dashboard cache database 1004. Subsequently, the user may send a request to the search system—via interaction with a search system interface delivered to the client device—to retrieve and deliver the saved user-customized dashboard to the user's client device. In some embodiments, the dashboard component 314 can also automatically retrieve and deliver the dashboard to that user's client device in response to detecting a similar notification criterion that initiated delivery of the original (unmodified) dashboard to the user (e.g., a similar event notification, or a determination that the user has returned to the same machine). In this scenario, the user's modifications serve as feedback to the dashboard component 314 indicating the user's preferred presentation for the data delivered under that particular circumstance. Thus, when the notification event re-occurs at a later time, the dashboard component 314 will retrieve the previously saved user-modified dashboard rather than construct a new dashboard for the event.

In some embodiments, the system can also allow the user to add elements to the dashboard within the scope of the user's role, location, and context. For example, if more information for an industrial process being visualized by the dashboard (e.g., a machine, device, workcell, etc.) is available but not currently displayed on the dashboard, the dashboard may include a control for invoking a list of other available data items or graphical representations that can be selected for inclusion on the dashboard. The system will filter the data items presented to the user in accordance with the user's allowable scope, based on the user's role, location, and/or other current contextual information. Selection of an item from the list will cause the selected data item to be added to the dashboard. If the user wishes to make this addition permanent, the user can select a "save" control on the dashboard that causes the modified dashboard to be saved in dashboard cache database 1004 for later retrieval. The modified dashboard can be retrieved manually by the user via client device 1006, or can be selected dynamically by dashboard component 314 in response to detection of a similar notification event to that which caused the original dashboard to be created and sent to the user.

Dashboards that have been modified by a particular user and saved in dashboard cache database 1004 can be made private such that only the user who performed the modification will have access to the modified dashboard. In some embodiments, the user may also make the modified dashboard public, such that the system will allow other authorized users to access the dashboard under certain circumstances. For example, if a user chooses to make a modified dashboard public, the system will allow other users to request delivery of the modified dashboard to their client devices. In response to such requests, the system will deliver the modified dashboard to the requesting user's client device if all necessary delivery conditions are satisfied (e.g., if the user is has a suitable role for delivery of the dashboard, if the user is in a proper line-of-sight location relative to a machine when the requested dashboard has an associated line-of-sight delivery condition, etc.).

In some embodiments, the search and notification system can track usage statistics for cached dashboard, and prioritize delivery of saved dashboards based on these statistics. For example, based on this monitoring, the system may determine that a particular saved dashboard associated with an industrial machine is accessed or dynamically retrieved at a frequency that exceeds a threshold frequency indicative of a high utility. Accordingly, rather than generate a new dashboard in response to a notification event relating to the machine, the system will retrieve and deliver this dashboard when the notification event is detected.

In a distributed data environment such as an industrial facility, the same data item may be available from multiple different sources. For example, an industrial controller may store live or historical data items relating to a controlled industrial process on local storage, while also exporting historical values for the data items to an external data historian device or cloud-based historical data storage, resulting in duplicates of those data items on different storage devices. In another example, the controller may interface with a telemetry device (e.g., a flow meter, a temperature meter, a pressure meter, etc.) that provides measurement data to the controller for processing by the controller's user-defined control program. Consequently, these live telemetry values may be available concurrently in the controller as well as in the telemetry device itself.

Figure 11A:
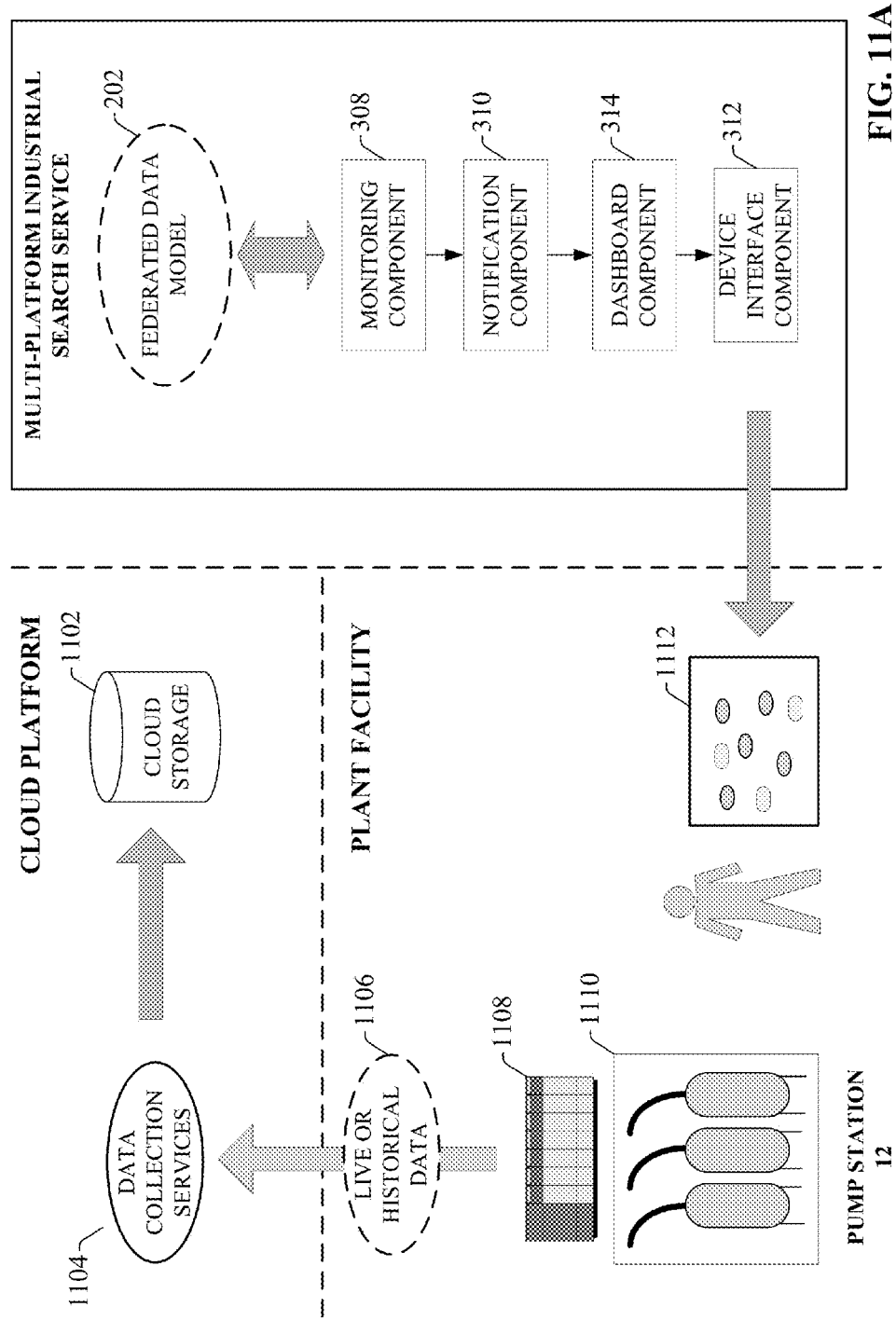
Figure 11B:
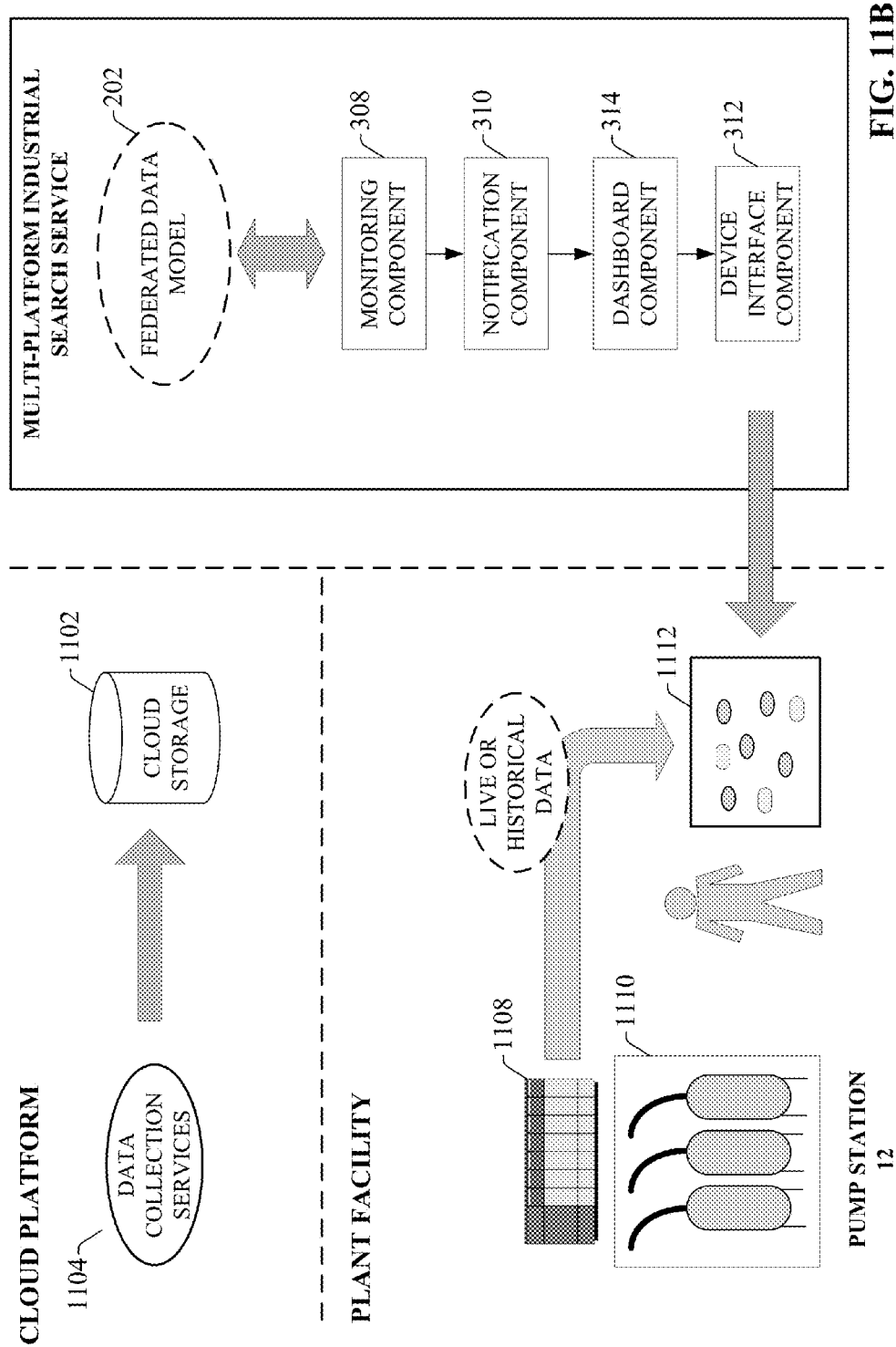

If the same data item for populating a dashboard is available from multiple sources, some embodiments of the search and notification system can dynamically select the most suitable data source from which to retrieve data for display on the dashboard. FIGS. 11A-11C are diagrams illustrating dynamic selection of a data source. As shown in FIG. 11A, an industrial system 1110 (pump station 12) is controlled by industrial controller 1108 in this example. In addition to performing its control functions, industrial controller 1108 exports live or historical data 1106 to data collection services 1104 executing on a cloud platform. The data collection services 1104 may interface with industrial controller 1108 either directly via the plant network, or via a cloud gateway device that resides on the plant network and serves to retrieve selected data items from the controller and send the data to the cloud platform The exported data may be stored on cloud-based storage 1102 for archival purposes, or may be processed by cloud-based data processing services in connection with other functions (e.g., reporting service, cloud HMI services, analytics services, etc.).

As described in previous examples, monitoring component 308 monitors federated data model 202 (which is kept up-to-date by indexing component 304) and notification component 310 initiates generation and delivery of a dashboard 1112 to a client device associated with one or more selected users. Since the system can track the user's location within the plant, the dashboard component 314 can dynamically link the dashboard 1112 to a preferred data source for one or more data items (e.g., operational or alarm data) based on the user's location. As shown in FIG. 11B, if the system determines that the user is near enough to the industrial controller 1108 to establish a near field communication link between the user's client device and the controller 1108, the dashboard component 314 will communicatively link data display items on the dashboard to their corresponding data table addresses in the industrial controller 1108, such that the dashboard is populated with data retrieved from the industrial controller 1108 via the near field connection. If the user is not near the industrial controller 1108, or moves outside the near field range of the controller, the dashboard component 314 can link the data items to another source of the data; e.g., the corresponding data items maintained on cloud-based storage 1102, as shown in FIG. 11C. If subsets of the data items required to populate the dashboard have previously been cached to the client device's local storage, the dashboard component 314 may also choose to link those data items to the corresponding stored data items in the client device's cache, providing a third possible source of data. In general, the search and notification system can dynamically shift the sources of the respective data items on the dashboard as the user's location or context changes, to ensure that a most suitable (e.g., nearest, lowest latency, etc.) data source is selected to populate the dashboard. In addition to location, other criteria that may be used by the system to determine a most suitable data source for a given data item can include a nearest data source to the user's current location, a source determined to have the lowest latency of the available data sources (e.g., as a function of each data source's processing power or processing load), a data source containing the most recently updated values for the data item, or other such criteria.

Figure 12:
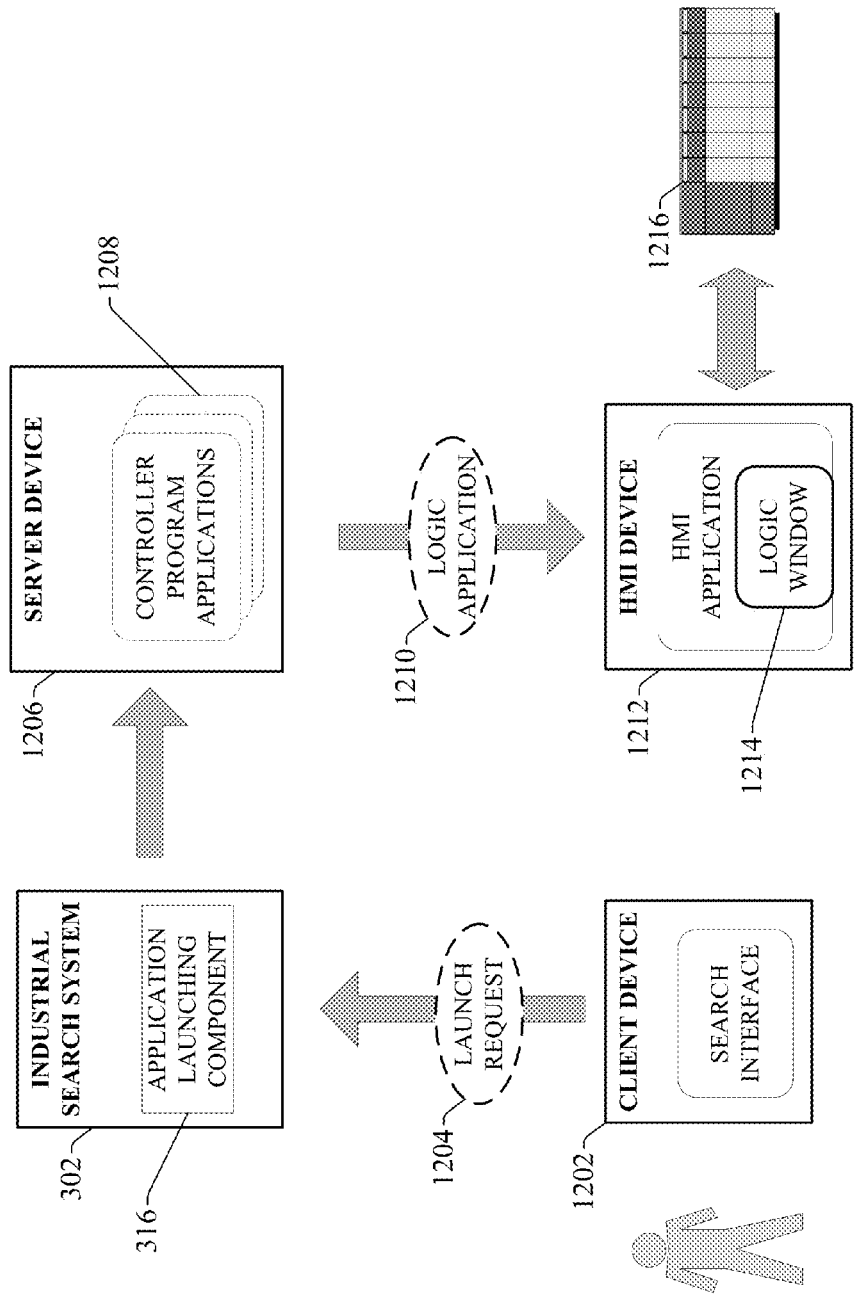
FIG. 12 is a diagram illustrating remote launching of a control program development window.

In some embodiments, the search and notifications system's infrastructure can allow a user to launch a control program viewing and/or development window within an HMI application by issuing a command from the user's client device. FIG. 12 is a diagram illustrating remote launching of a control program development window. In this example, a user in possession of a client device 1202 (e.g., mobile phone, laptop computer, tablet computer, wearable computer, etc.) is located near an industrial machine or automation system (not shown) under the control of industrial controller 1216. An HMI device 1212 (e.g., a graphical terminal) executing an HMI application is also located near the machine or industrial automation system, and renders live production and status data for the machine or automation system on one or more graphical interface screens. The HMI device 1212 reads the relevant data items from the controller's data table over a network connection and renders the data on the interface screens as alphanumeric display objects or as graphical animation states.

In connection with troubleshooting an issue relating to the machine or automation system, the user may wish to view the industrial control program (e.g., ladder logic, sequential function charts, etc.) being executed by the industrial controller 1216. For example, the user may wish to determine why a particular motion device of the automation system is not returning to a home position. Accordingly, the user may wish to view the ladder logic running on the industrial controller 1216 in order to learn the programmed conditions that are preventing the home operation. Conventionally, viewing the control program requires the user to interface a client device—such as a laptop computer—to the industrial controller 1216 and invoke the control program via a program viewing and development application executing on the client device. To eliminate the need to plug a client device into the industrial controller, one or more embodiments described herein can facilitate remote launching of control program development window within the HMI application running on the HMI device 1212.

In order to invoke a program development window remotely, the user can issue a launch request 1204 to the industrial search system 302 via client device 1202. Client device 1202 can interface with the industrial search system 302 using any suitable technique as described in previous examples. For example, client device 1202 may interface with the search system 302 via an Internet connection if the system is implemented on a web server, or via another type of wireless network connection if the search system 302 is implemented on a local server.

The launch request 1204 is processed by the application launching component 316 of the industrial search system 302, which is configured to issue commands to remotely launch a program development application on a target device (e.g., HMI device 1212) in accordance with data contained in the launch request 1204 and additional information collected by the search system 302. For example, the launch request 1204 may include an identification of the user's role (e.g., based on the role associated with the user's client device 1202 or based on authentication data provided by the user). Upon receipt of the launch request 1204, application launching component 316 confirms the user's permission to view the logic program based on the verified user role. The application launching component 316 may then identify the location of the client device 1202 from which the request was received, and make a determination of which target device should be selected as the host for the remotely launched program development application based on proximity to the client device 1202. The application launching component 316 can leverage any of the data maintained in federated data model 202 in order to correlate the location of client device 1202 with the locations of eligible target devices on which the program development application can be launched. Application launching component 316 can also infer, based on the client device's proximity to the automation system controlled by industrial controller 1216, that the user wishes to view the control program executing on that particular controller.

Since the application launching component 316 can process requests to launch control program viewing and/or development applications from any location within the plant—and for multiple different automation systems within the plant—the industrial search system 302 may have access to storage on which multiple controller program applications 1208 are stored. These program applications 1208 correspond to the different control programs in use throughout the plant. In the illustrated example, the controller program applications 1208 are stored on a server device 1206 that is separate from the industrial search system 302. However, in some implementations, the controller program applications 1208 can be maintained on the industrial search system itself.

Based on the launch request 1204, the determined location of the client device 1202, and the selected target device (HMI device 1212), the application launching component 316 sends a request to the server device 1206 to launch the control program corresponding to industrial controller 1216 on the HMI device 1212. In response to this command, server device 1206 issues a command to the HMI device 1212 to launch an instance of the program development environment as a logic window 1214 within the HMI application and to render the controller's ladder logic on the logic window 1214. The user can then view the control program on the HMI device. In some embodiments, the development environment can be launched in a read/write mode, allowing the user to edit the control program via interaction with the HMI device. In such embodiments, the ability to edit the program can be based on the determined user role.

In another example embodiment, this ability to launch a controller development environment within another application can also be implemented on a browser, allowing a user to launch a logic development window from a web page displayed on a browser. In an example scenario, the browser window may be displaying a web-based HMI or other web page on the user's client device 1202. From the web page, the user can initiate a command to launch a controller development window (e.g., a ladder logic editing window) within the browser. The command can be sent to the search system 302, which routes the command to server device 1206 storing the particular logic development applications in use throughout the plant. The server device 1206—which may be a web server—can retrieve the selected controller development application, launch the development program on the client device 1202, and cause the application to be opened within the running instance of the development environment. In a variation of this embodiment, the client device 1202 can have a local version of the controller development program installed, which can be launched when the command is issued via the web page.

Figure 13:
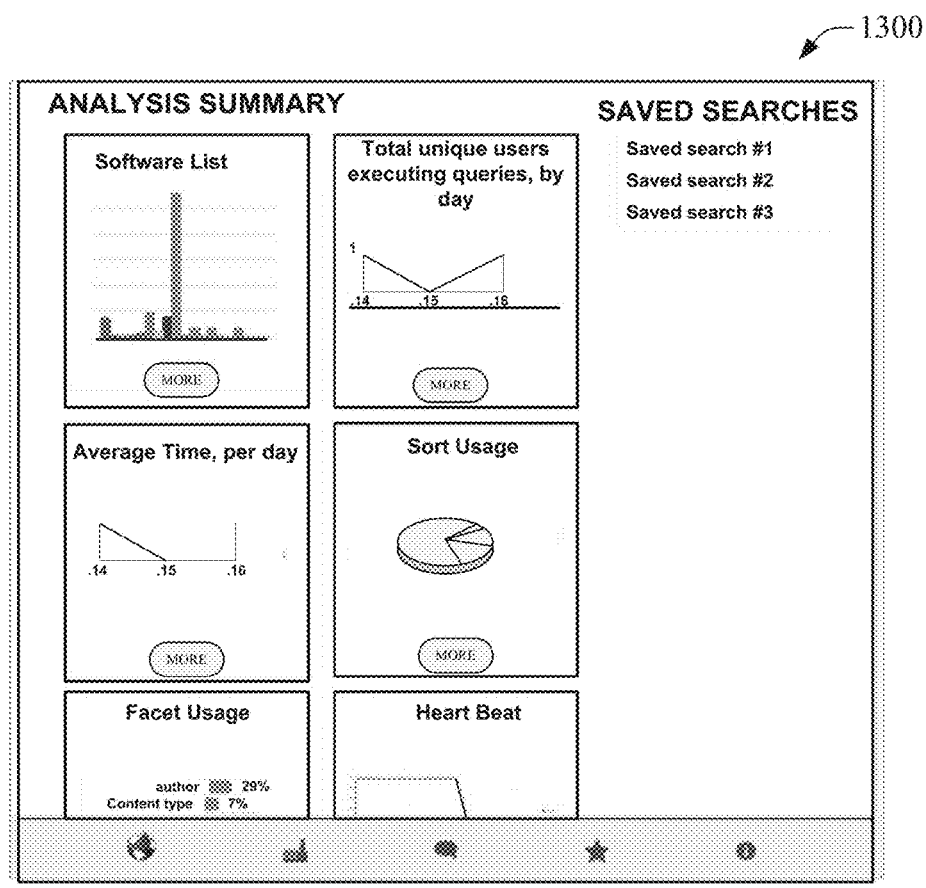
FIG. 13 is an example management or administrative dashboard.
Figure 14:
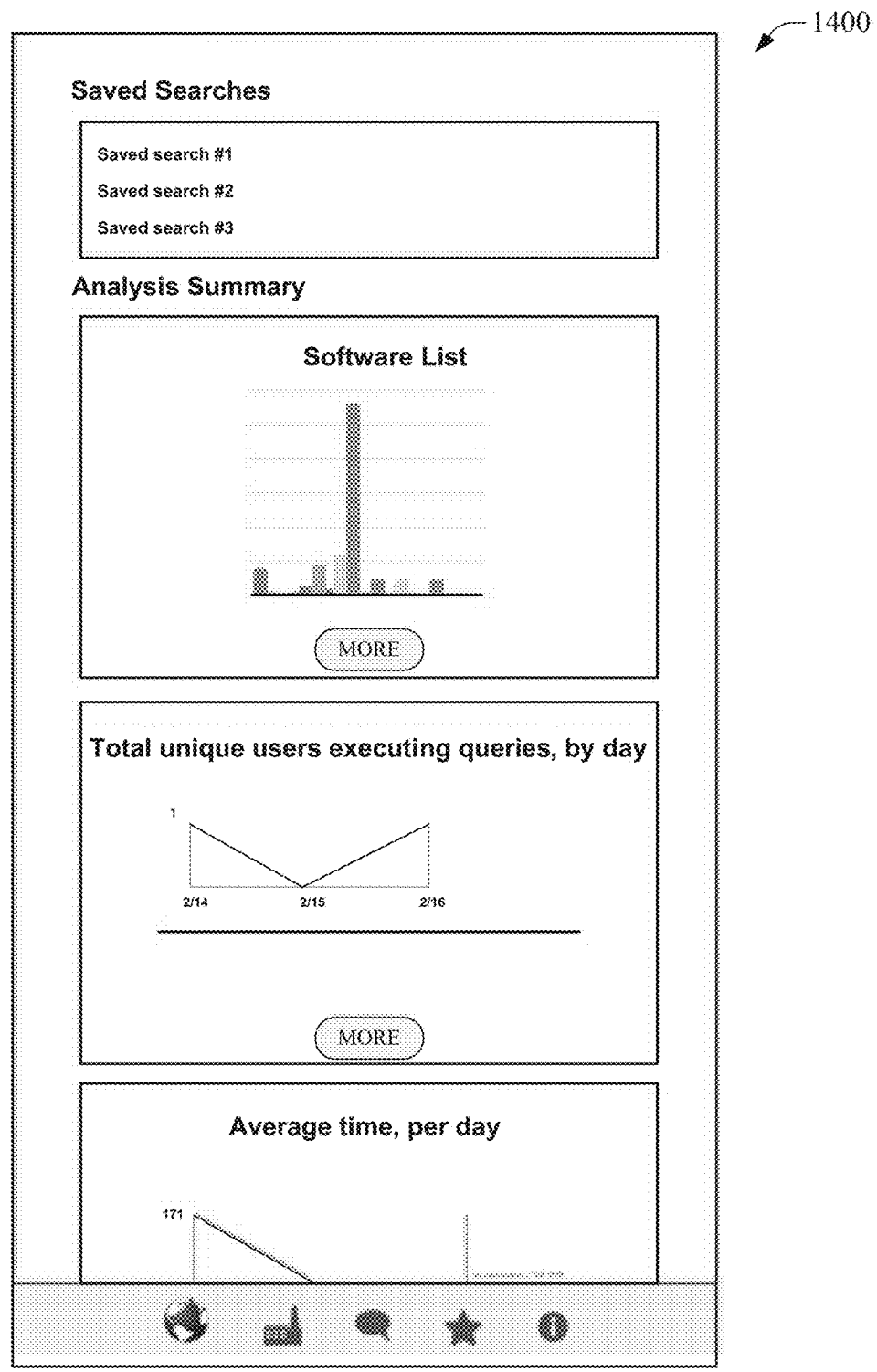
FIG. 14 is an example management or administrative dashboard formatted for a narrower client device relative to the dashboard of FIG. 13.

FIG. 13 is a screenshot of an example, non-limiting dashboard 1300 that can be generated and delivered by the multi-platform search system. Dashboard 1300 is a role-specific graphical visualization that can be delivered to a user having a management or system administrator role, and provides high-level information regarding recorded interactions with the search system itself. The system can format the dashboard to accommodate the size and dimensions of the client device to which the dashboard is delivered. For example, FIG. 14 illustrates an alternative management dashboard 1400 formatted for viewing on a narrower device relative to that used to display dashboard 1400.

Figure 15:
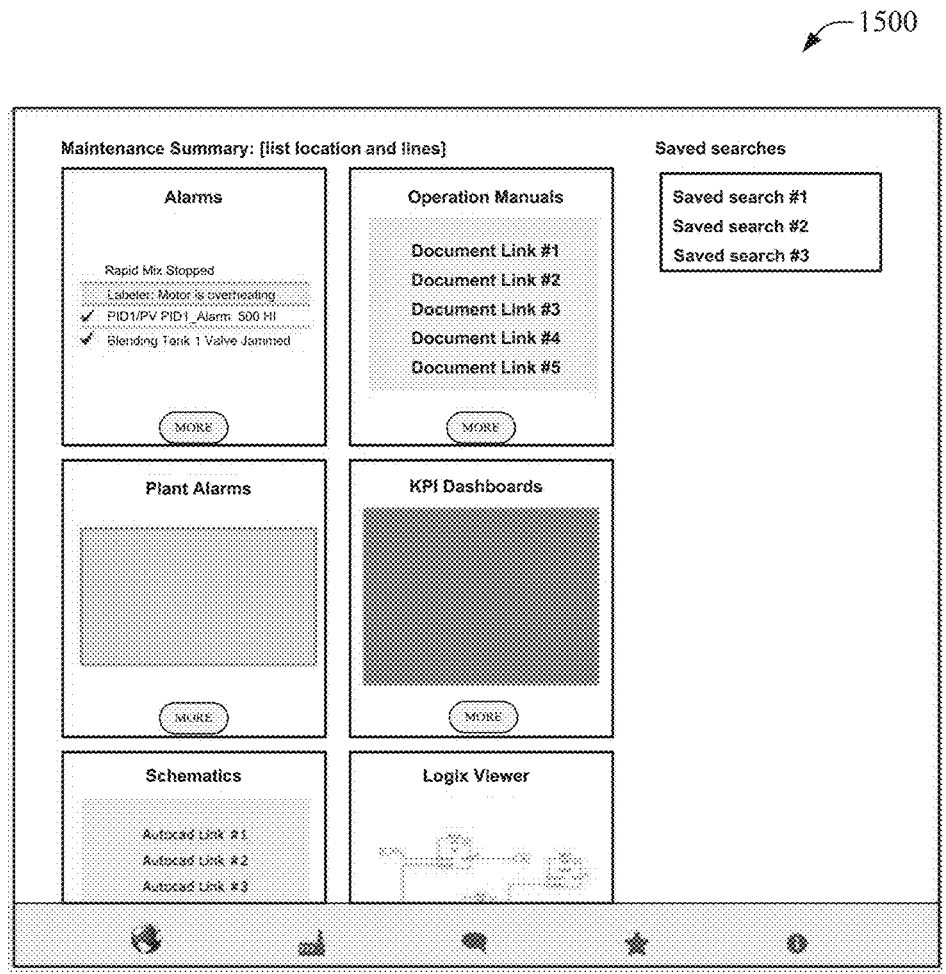
FIG. 15 is an example maintenance engineer dashboard.

FIG. 15 is a screenshot of an example, non-limiting dashboard 1500 generated for a maintenance engineer role. Example dashboard 1500 includes a listing of alarms, links to operation manuals relevant to the equipment in the work area served by the maintenance engineer, a view of one or more areas of the plant, and a key performance indicator (KPI) dashboard that graphically depicts statistics for one or more key performance indicators relevant to the maintenance engineer's work area (e.g., electricity usage and demand statistics, water usage, gas usage, etc.). Maintenance engineer dashboard 1500 also includes links to relevant schematics (e.g., Autocad drawings or other schematic formats), which can be invoked through interaction with the dashboard 1500, and a logic viewer that can be used to invoke and view logic executing on a selected industrial controller.

Figure 16:
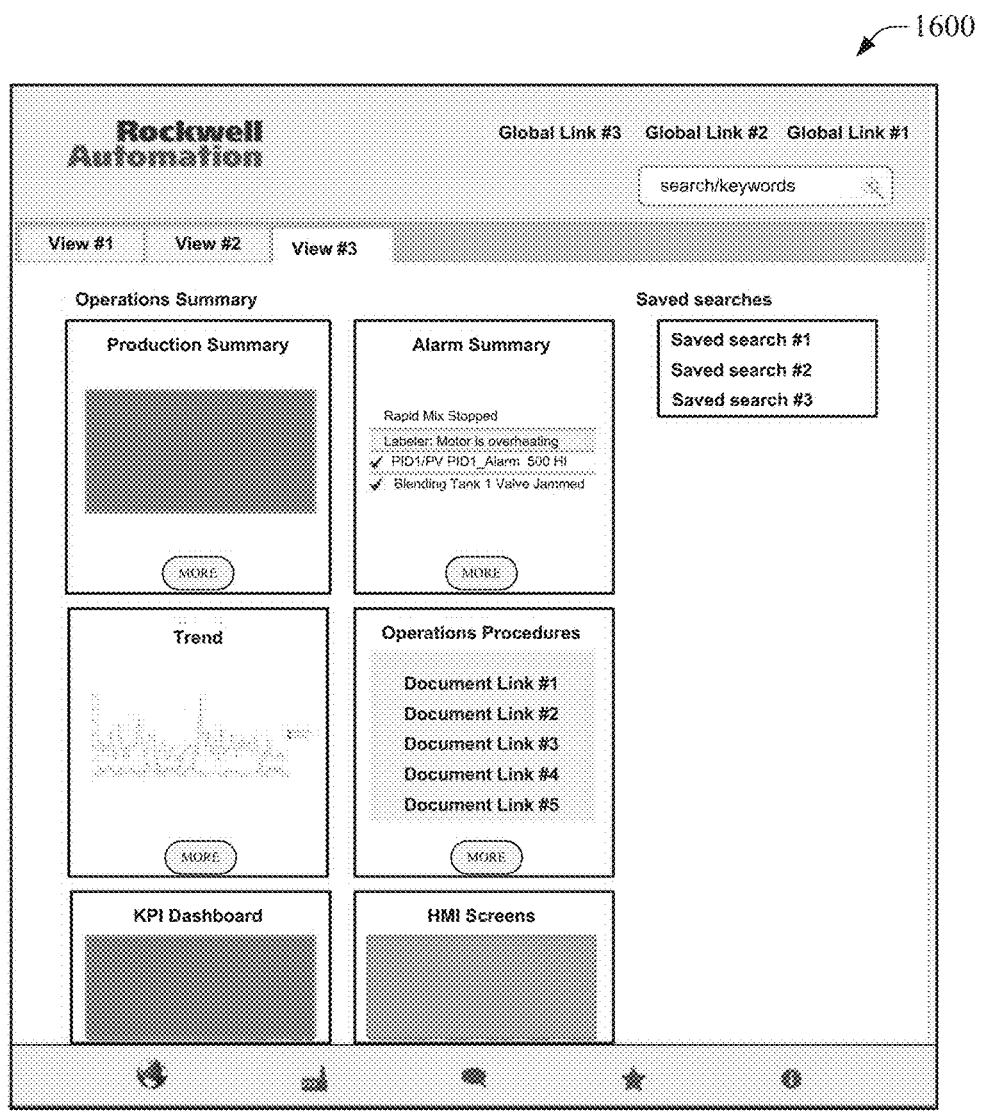
FIG. 16 is an example operator dashboard.

FIG. 16 is a screenshot of an example, non-limiting dashboard 1600 generated for an operator. Operator dashboard 1600 can include a production summary graphic depicting production statistics for the machine or work area served by the operator, an alarm summary for the work area, graphical trends for one or more operational or production statistics, links to documentation on operating procedures relevant to the operator's work area, a KPI dashboard, and an HMI area on which HMI screens for a machine or work area can be invoked and viewed.

Figure 17:
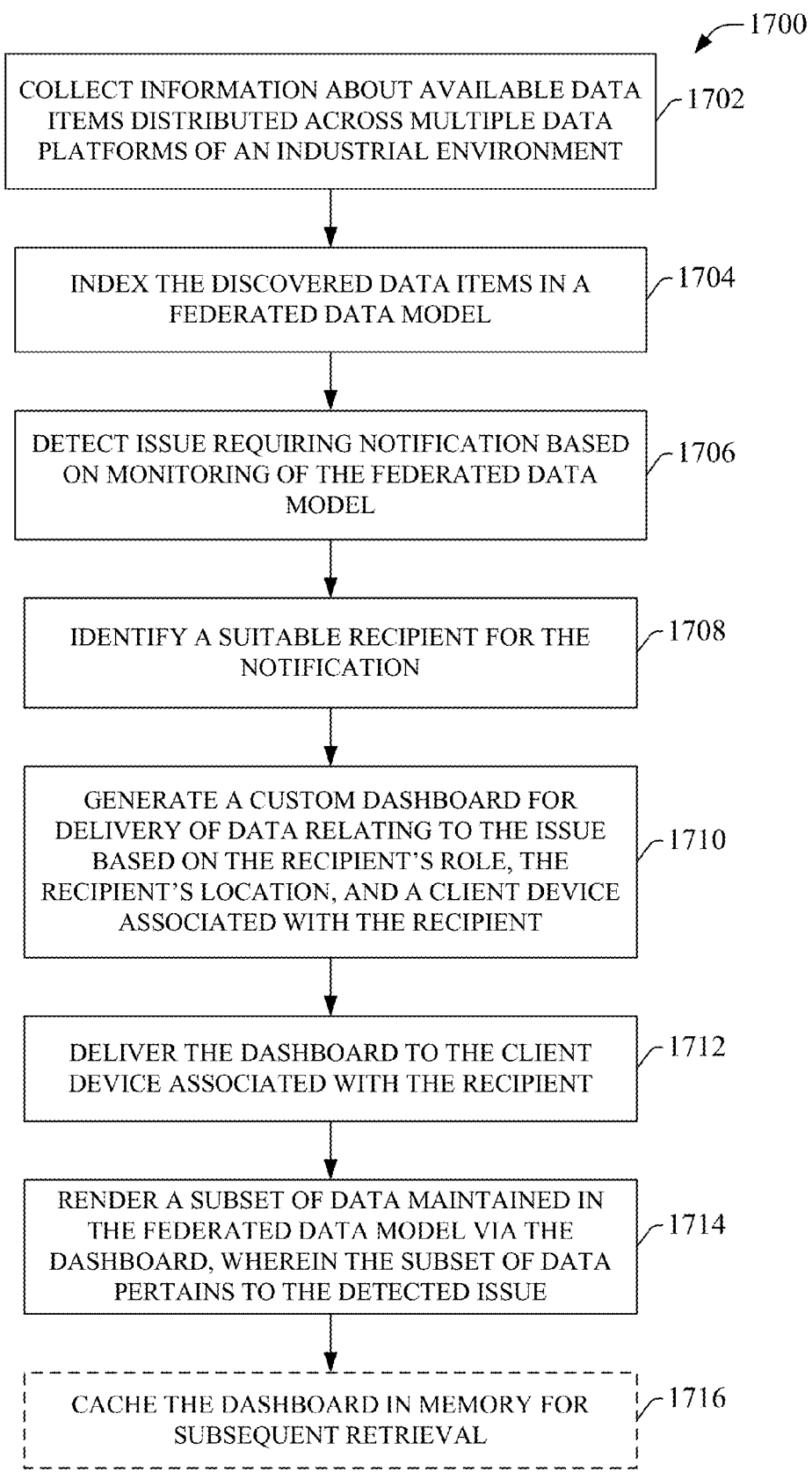
FIG. 17 is a flowchart of an example methodology for generating and delivering customized dashboards for visualization of industrial data.
Figure 18:
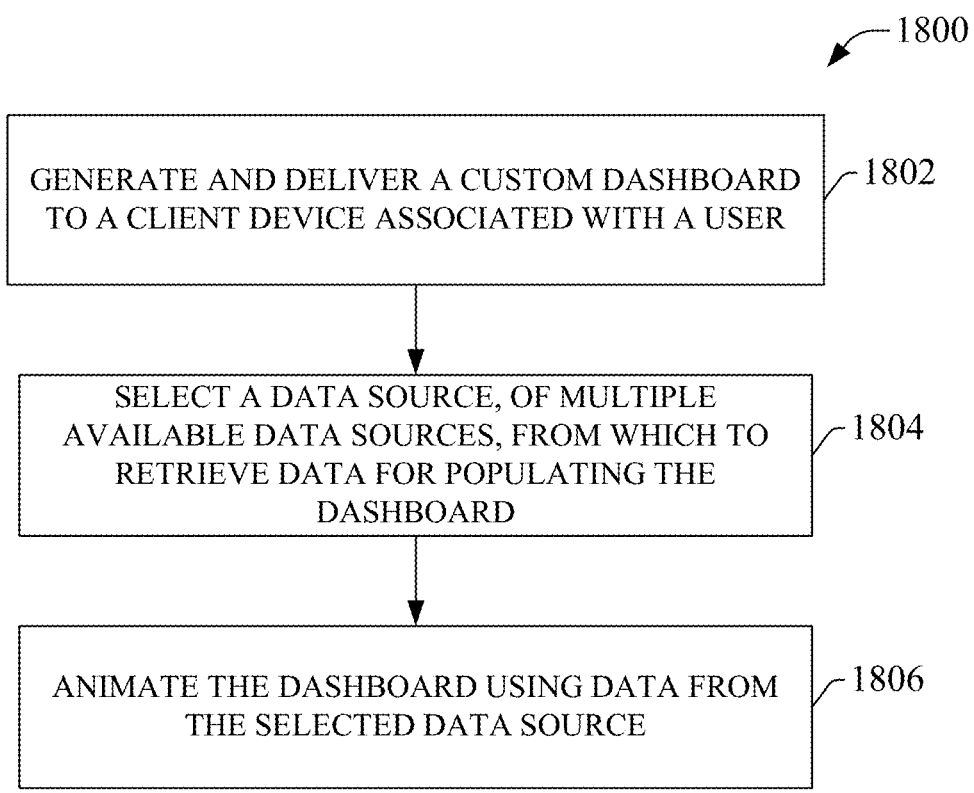
FIG. 18 is a flowchart of an example methodology for dynamically selecting a data source for a custom dashboard.

FIGS. 17-18 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 17 is an example methodology 1700 for generating and delivering customized dashboards for visualization of industrial data. Initially, at 1702, information about available data items distributed across multiple data platforms of an industrial environment is collected. This information can be collected, for example, by an indexing component of an industrial search system implemented on a stand-alone server, a web server, a cloud platform, or other implementation. In some embodiments, the information can be collected using a crawler that navigates a plant network and collects information regarding devices and systems in use (e.g., industrial controllers, HMIs, motor drives, documentation repositories, inventory tracking systems, etc.), and the available data associated with each device or system. The indexing component can also identify correlations between data items across the various devices and data platforms (e.g., identifying that a data tag referenced on a particular rung of a control logic program is also referenced on a display screen of an HMI). At 1704, the data items (and the relationships between the data items) discovered at step 1702 are indexed in a federated data model.

At 1706, an issue requiring notification is detected based on monitoring of the federated data model. For example, a monitoring component can monitor data items maintained in the federated data model relating to performance or operational metrics of an industrial system and determining when the data items satisfy a criterion indicative of a performance issue requiring attention by an operator or maintenance expert. At 1708, in response to detection of the issue, a suitable recipient for the notification is identified. A suitable recipient can be determined, for example, based on defined notification rules that specify one or more plant employees to whom notifications are to be sent in response to detection of different types of performance issues. The rules may specify the employees explicitly (e.g., be defining one or more user identities or user-specific client devices), or may specify a category of employee (e.g., a user role or area of expertise) corresponding to different types of maintenance issues.

At 1710, a custom dashboard is generated for delivery of data relating to the issue. The dashboard can be generated based at least in part on the role of the recipient selected at step 1708, a location of the recipient, and a client device associated with the recipient. At 1712, the dashboard is delivered to the client device associated with the recipient selected at step 1708. At 1714, a subset of the data maintained in the federated data model is rendered via the dashboard, wherein the subset pertains to the detected issue. Optionally, at step 1716, the dashboard is cached in memory for subsequent delivery to the recipient, or for subsequent delivery to another qualified recipient in response to detection of a similar maintenance issue.

Although methodology 1700 describes the dashboard as being generated and delivered in response to detection of a performance issue relating to an industrial system, the dashboard can also be generated and delivered in response to other triggers. For example, the dashboard can be generated and delivered in response to a determination that a user is in proximity to a particular machine or industrial device, and/or an inference that the user is viewing a particular machine or device.

FIG. 18 illustrates an example methodology 1800 for dynamically selecting a data source for a custom dashboard. Initially, at 1802, a custom dashboard is generated and delivered to a client device associated with a user (e.g., as described above in connection with methodology 1700). At 1804, a data source, of multiple available data sources, is selected from which to retrieve data for populating the dashboard. For example, the data required to populate the dashboard may be available from the federated data model of an industrial data indexing and search system that generated the dashboard, from a cloud-based data collection service, and directly from the relevant industrial devices themselves. The search system can select one of these sources from which to retrieve data based on the location of the user relative to the respective data sources, determine relative latencies of the respective data sources, times of the most recent data refreshes performed by the respective data sources, etc. At 1806, the dashboard is animated using data from the data source selected at step 1804.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
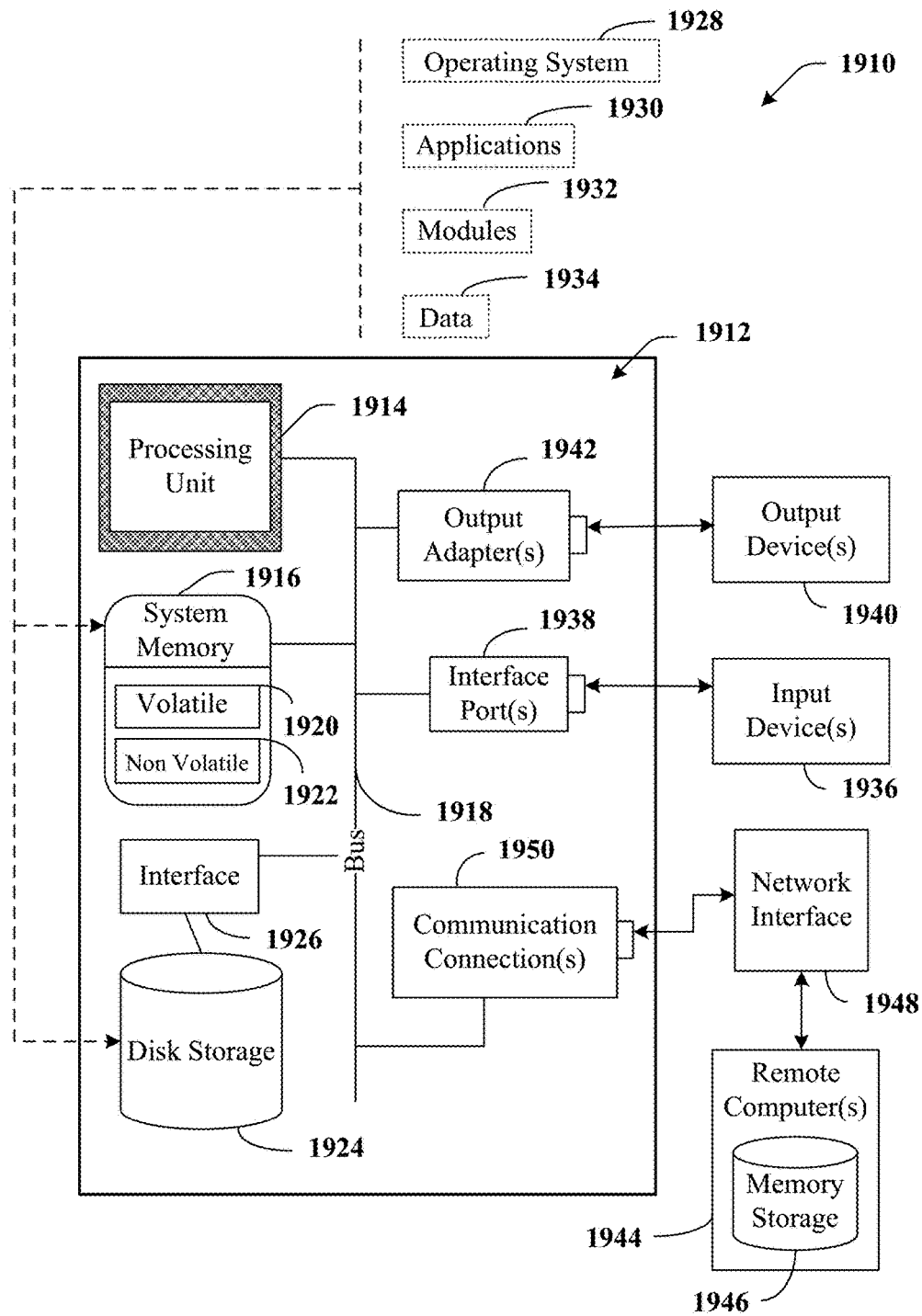
FIG. 19 is an example computing environment.
Figure 20:
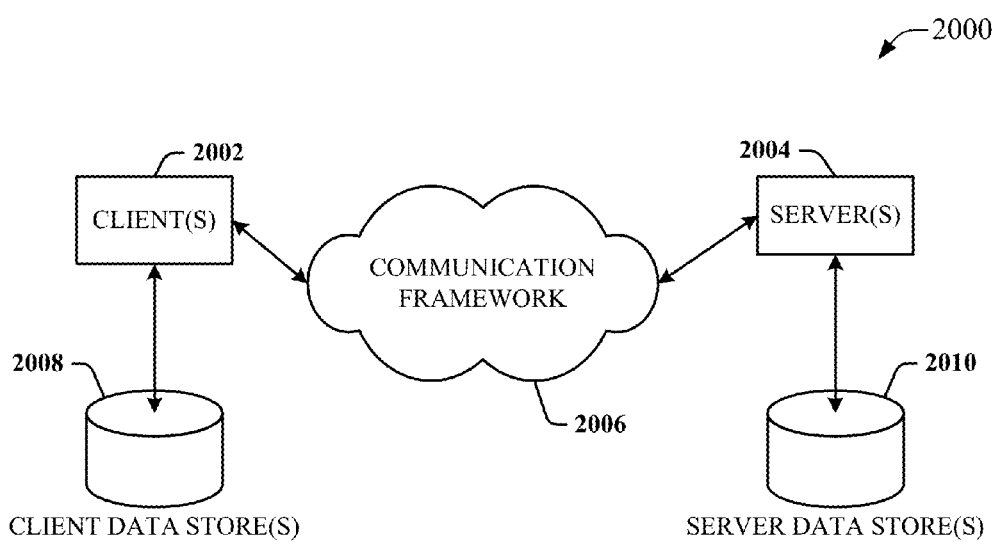
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented.

With reference to FIG. 19, an example environment 1910 for implementing various aspects of the aforementioned subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Multi-core microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable PROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also includes removable/non-removable, volatile/non-volatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapters 1942 are provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1948 can also encompass near field communication (NFC) or Bluetooth communication.

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for generation and delivery of industrial dashboards, comprising:
    a memory that stores computer-executable components;
    a processor, operatively coupled to the memory, that executes the computer-executable components, the computer-executable components comprising:
        a monitoring component configured to determine that one or more industrial data items maintained in a federated data model satisfy a criterion defined by monitoring rule data indicative of a performance issue relating to an industrial asset;
        a notification component configured to, in response to a determination by the monitoring component that the one or more data items satisfy the criterion, select a user, of a set of users defined by notification rule data, to be notified of the performance issue based on a user role associated with the user and respective current locations of the set of users relative to a location of a source of the performance issue;
        a dashboard component configured to, in response to the determination, generate a visualization window for presentation of data relating to the performance issue, wherein the data is selected and formatted on the visualization window based on the user role and a current location of the user within an industrial environment; and
        a device interface component configured to send the visualization window to a client device associated with the user,
        wherein the dashboard component is further configured to, in response to a determination that the user role is associated with permission to view a control program that executes on an industrial controller associated with the industrial asset, generate the visualization window to include a control that, in response to selection,
            selects a target device, of eligible target devices, based on a correlation between a location of the client device and locations of the eligible target devices, and
            launches a program viewer on the target device that renders the control program on the target device.

2. The system of claim 1, wherein the data relating to the performance issue comprises at least one of current status information for an industrial device related to the performance issue, maintenance history information for the industrial device, production history data for a workcell or machine relating to the performance issue, energy consumption data for the workcell or machine, inventory information for a replacement part determined to be required to address the performance issue, a link to documentation for the industrial device, or a link to an external data source comprising information relevant to the performance issue.

3. The system of claim 1, wherein the user role comprises at least one of a machine operator role, a maintenance role, an engineering role, a management role, or an accounting role.

4. The system of claim 1, wherein the dashboard component is configured to embed, within the visualization window, a human-machine interface screen that renders a graphical representation of an industrial process affected by the performance issue.

5. The system of claim 1, wherein the notification component is further configured to
    identify, based on a referencing of the notification rule data, a first subset of the users defined as having training relevant to the industrial asset,
    determine, based on tracking data collected for the first subset of the users, respective current locations of the first subset of the users relative to the location of the source of the performance issue,
    select, from the first subset of the users, a second subset of the users having respective current locations that are within a defined radius of the location of the source of the performance issue, and
    select the user to be notified of the performance issue from the second subset of the users.

6. The system of claim 1, wherein the dashboard component is further configured to at least one of filter the data relating to the performance issue or format the data relating to the performance issue based on the user role.

7. The system of claim 1, wherein the dashboard component is further configured to generate the visualization window to include, as the data relating to the performance issue, operational or status information for a set of machines within the industrial environment determined to be within a defined distance from the current location of the user.

8. The system of claim 1, wherein the computer-executable components further comprise an indexing component configured to discover available data items, including the one or more industrial data items, distributed across multiple data sources of the industrial environment and record instances and locations of the available data items in the federated data model.

9. The system of claim 8, wherein the indexing component is further configured to infer a relationship between two industrial devices based on analysis of the federated data model, and to generate the visualization window to include information relating to the two industrial devices based on the relationship.

10. The system of claim 1, wherein the notification component is further configured to select the user, of the set of users defined by the notification rule data, to be notified of the performance issue further based on a work schedule information defined for the user on an availability tracking system.

11. The system of claim 1, wherein the dashboard component is further configured to, in response to a determination that the user role is a maintenance user role, generate the visualization window to render maintenance information associate the industrial asset, and the maintenance information comprises at least one of an indication of whether the industrial asset is currently locked out for maintenance or a digital note associated with the industrial asset.

12. A method for generating a visual notification of an industrial event, comprising:
    determining, by a system comprising a processor, that one or more industrial data items indexed in a federated data model indicate occurrence of an event by an industrial automation system for which attention is required;
    selecting, by the system in response to the determining, a recipient, of a plurality of users defined by notification rule data, for a notification of the event, wherein the selecting comprises selecting the recipient based on a user role defined for the recipient and respective current locations of the plurality of users relative to a location of the industrial automation system;
    generating, by the system in response to the selecting, a dashboard graphic that renders event data relating to the event, wherein
        the event data is selected and formatted based on the user role and a current location of the recipient relative to the industrial automation system, and
        the generating comprises, in response to determining that the user role is associated with permission to view industrial control programming, generating the dashboard graphic to include an interactive control that, in response to selection,
            selects a target device, of eligible target devices, based on a correlation between a location of the recipient and locations of the eligible target devices, and
            launches a program viewer on the target device that renders a control program being executed by an industrial controller of the industrial automation system; and
    sending, by the system, the dashboard graphic to a client device associated with the recipient.

13. The method of claim 12, wherein the generating comprises generating the dashboard graphic to include, as the event data, at least one of current status information for the industrial automation system, maintenance history information for the industrial automation system, production history data for the industrial automation system, energy consumption data for the industrial automation system, inventory information for a replacement part determined to be required in response to the event, a link to documentation for an industrial device of the industrial automation system, or a link to an external data source comprising information relevant to the event.

14. The method of claim 12, wherein the generating comprises at least one of hiding a subset of available data relating to the event or formatting the available data relating to the event based on at least one of the user role or the current location of the recipient relative to the industrial automation system.

15. The method of claim 12, wherein the selecting comprises selecting the recipient in response to a determination that the current location of the recipient is within a defined proximity of the industrial automation system and that an area of expertise of the recipient defined by the notification rule data is relevant to the industrial automation system.

16. The method of claim 12, further comprising:
    deploying a discovery agent on a plant network;
    receiving information from the discovery agent about available data items, including the one or more industrial data items, located on multiple data sources of an industrial environment; and
    indexing respective locations of the data items in the federated data model.

17. The method of claim 16, further comprising inferring a relationship between two industrial devices within the industrial environment based on analysis of the federated data model, wherein the generating the dashboard graphic comprises generating the dashboard graphic to include information relating to the two industrial devices based on the relationship.

18. A non-transitory computer-readable medium having stored thereon instructions that, in response to execution, cause a system comprising a processor to perform operations, the operations comprising:
    determining that one or more industrial data items indexed in a federated data model satisfy a criterion indicative of a performance issue relating to an industrial asset; and
    in response to the determining:
        selecting a recipient, from multiple users defined by notification rule data, to be notified of the performance issue, wherein the selecting comprises selecting the recipient based on a user role defined for the recipient and respective current locations of the multiple users relative to a location of the industrial asset,
        generating a dashboard display that renders event data relating to the performance issue, wherein the event data is selected and formatted on the dashboard display based on the user role associated with the recipient and a current location of the recipient relative to the industrial asset; and
        sending the dashboard display to a client device associated with the recipient,
        wherein the generating comprises, in response to determining that the user role is associated with permission to view an industrial control program being executed by an industrial controller that controls the industrial asset, generating the dashboard display to include an interactive control that, in response to selection,
            selects a target device, of candidate target devices, based on a correlation between a location of the client device and locations of the candidate target devices, and
            launches a program viewer on the target device that renders the control program.

19. The non-transitory computer-readable medium of claim 18, wherein the generating comprises generating the dashboard display to include, as the event data, at least one of current status information for the industrial asset, maintenance history information for the industrial asset, production history data the industrial asset, energy consumption data for the industrial asset, inventory information for a replacement part determined to be required to address the performance issue, a link to documentation for the industrial asset, or a link to an external data source comprising information relevant to the performance issue.

20. The non-transitory computer-readable medium of claim 18, wherein the generating comprises at least one of hiding a subset of available data relating to the performance issue or formatting the available data relating to the performance issue based on at least one of the user role or the current location of the recipient relative to the industrial asset.

\* \* \* \* \*